(12) United States Patent
Yang

(10) Patent No.: US 8,649,950 B2
(45) Date of Patent: Feb. 11, 2014

(54) DRIVING SYSTEM HAVING EPICYCLE GEAR SETS WITH DUAL OUTPUT ENDS EQUIPPED WITH INDIVIDUALLY-CONTROLLED MULTIPLE SPEED-RATIO DEVICE

(76) Inventor: Tai-Her Yang, Dzan-Hwa (TW)

( * ) Notice: Subject to any disclaimer, the term of this patent is extended or adjusted under 35 U.S.C. 154(b) by 0 days.

(21) Appl. No.: 13/444,077

(22) Filed: Apr. 11, 2012

(65) Prior Publication Data

US 2013/0275014 A1 Oct. 17, 2013

(51) Int. Cl.
*F16H 37/00* (2006.01)
*G06F 17/00* (2006.01)

(52) U.S. Cl.
USPC ............. 701/52; 475/1; 475/3; 475/5; 475/6; 475/84; 475/150; 475/201; 475/204; 475/209; 475/210

(58) Field of Classification Search
USPC ............. 701/52; 475/1, 3, 5, 6, 84, 150, 201, 475/204, 209, 210
See application file for complete search history.

(56) References Cited

U.S. PATENT DOCUMENTS

2009/0305838 A1* 12/2009 Borgerson et al. ............. 475/276
2013/0225348 A1* 8/2013 Yang ................................. 475/5

* cited by examiner

*Primary Examiner* — Mary Cheung
*Assistant Examiner* — Brian P Sweeney
(74) *Attorney, Agent, or Firm* — Bacon & Thomas, PLLC

(57) ABSTRACT

A rotary power source directly drives an epicyclic gear set, or drives the epicyclic gear set through a transmission device, and a respective controllable multiple speed-ratio device is individually installed between two output shafts of the epicyclic gear set and the loads driven thereby, to enable the wheel sets of the driven loads to be differentially driven with a different driving speed ratio and driving torque while propelling a combined common load. A limited slip differential or stabilizer device may be connected between the output ends of the two controllable multiple speed-ratio devices, the limited slip differential or stabilizer providing a slip coupling torque to stabilize driving of the respective individual loads, as necessary.

18 Claims, 5 Drawing Sheets

DRIVING SYSTEM HAVING EPICYCLE GEAR SETS WITH DUAL OUTPUT ENDS EQUIPPED WITH INDIVIDUALLY-CONTROLLED MULTIPLE SPEED-RATIO DEVICE

BACKGROUND OF THE INVENTION (a) Field of the Invention

The present invention provides a driving system having epicycle gear sets with dual output ends equipped with individually-controlled multiple speed-ratio devices, which utilizes the rotary kinetic power of a rotary kinetic power source to directly drive the epicyclic gear sets, or to drive the epicyclic gear sets through a transmission device, the controllable multiple speed-ratio devices being individually installed between respective output shafts of the two epicyclic gear sets and the individual loads driven thereby, so that the wheel sets of the driven loads are enabled to perform variation of the driving speed ratio and the driving torque while propelling a combined common load. A limited slip differential or a stabilizer device composed of a dual shaft connecting device having slip coupling torque can be further installed between the output ends of the two controllable multiple speed-ratio devices according to actual needs, so that when differential operation is performed between the two loads, the stabilizer device serves to stabilize the operation of the drive system.

(b) Description of the Prior Art

When a conventional single power train performs differential driving of two or more than two of individual driven loads of a common load body, a differential wheel set is often used for achieving the function of differential speed. However, the conventional differential wheel set has the disadvantage of not being able to generate a torque differential between the two loads.

SUMMARY OF THE INVENTION

The present invention provides a driving system having epicycle gear sets with dual output ends equipped with individually-controlled multiple speed-ratio devices, which utilizes the rotary kinetic power of a rotary kinetic power source to directly drive the epicyclic gear sets, or to drive the epicyclic gear sets through a transmission device, the controllable multiple speed-ratio devices between individually installed between respective output shafts of the epicyclic gear sets and the respective individual loads driven thereby, so that the wheel sets of the driven loads are enabled to perform variation of the driving speed ratio and the driving torque and thereby propel a combined common load. Between the output ends of the two controllable multiple speed-ratio devices, a limited slip differential or a stabilizer device composed of a dual shaft connecting device having slip coupling torque may be further installed according to actual needs, so that when differential operation is performed between the two driven loads, the stabilizer device serves to stabilize operation of the drive system.

According to the present invention, the driving system having epicycle gear sets with dual output ends equipped with individually-controlled multiple speed-ratio devices can be applied in a vehicle or an industry-used, agriculture-used or specially-designed carrier with front wheel drive, rear wheel drive, four wheel drive, multiple wheel drive, or a drive that includes belts installed at two sides.

DESCRIPTION OF MAIN COMPONENT SYMBOLS

Figure 1:
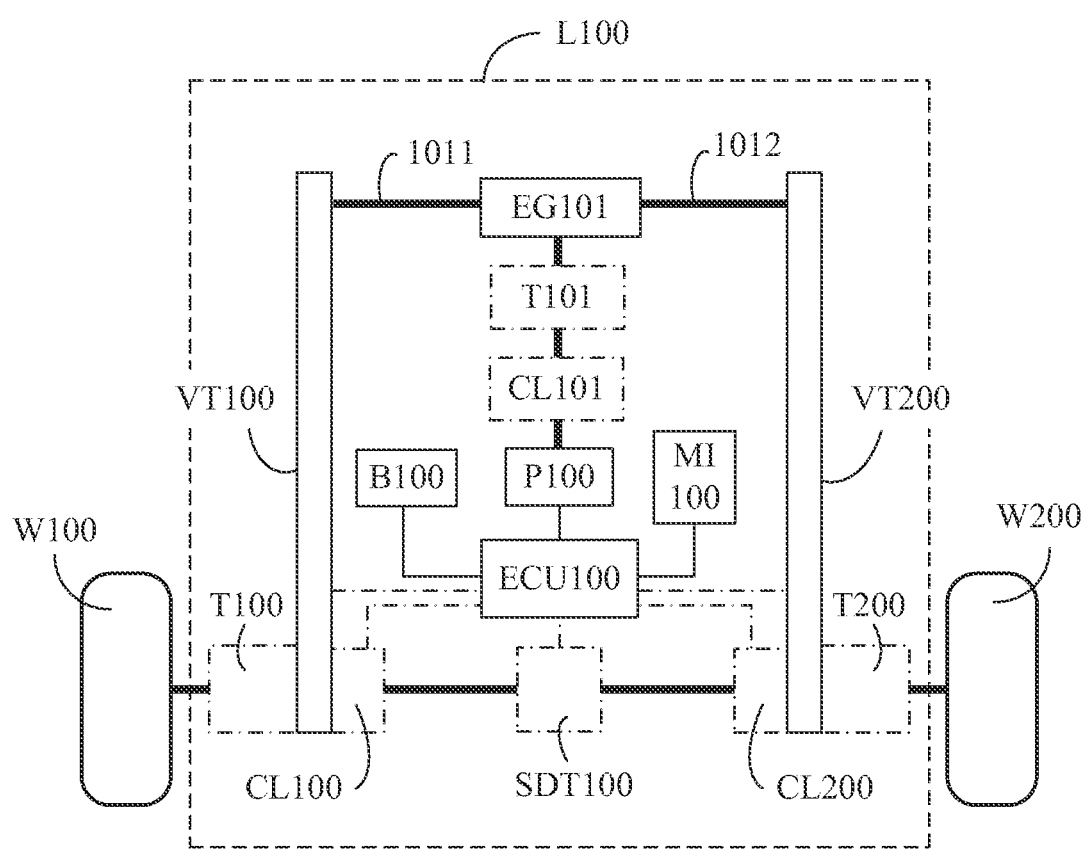
FIG. 1 is a schematic view illustrating a first embodiment of the present invention.

B100: Electric power source
CL101: Input end clutch device
CL100、CL200、CL300、CL400: Output end clutch device
VT100、VT200、VT300、VT400: Controllable multiple speed-ratio device
EG101: First epicyclic gear set
EG102: Second epicyclic gear set
ECU100: Control unit
1011、1021: Left end output shaft
1012、1022: Right end output shaft
L100: Common load body
MI100: Operation interface
P100: Rotary kinetic power source
S100: Direction changing signal sensor
SDT100、SDT200: stabilizer device
T100、T101、T200、T300、T400: Transmission device
W100、W200、W300、W400: Wheel set

DETAILED DESCRIPTION OF THE PREFERRED EMBODIMENTS

The present invention provides a driving system having epicycle gear sets with dual output ends equipped with individually-controlled multiple speed-ratio devices, which mainly consists of:

a rotary kinetic power source (P100);
an epicyclic gear set; and
a controllable multiple speed-ratio device; wherein
the rotary kinetic power of a rotary kinetic power source serves to drive the epicyclic gear set, and a controllable multiple speed-ratio device is individually installed between output shafts of the epicyclic gear sets and the respective individual loads driven thereby, so that the wheel set of the driven loads are enabled to perform variation of the driving speed ratio and the driving torque and thereby propel a combined common load.

The common load body (L100) is mainly defined as the frame body of a vehicle, and is arranged to be installed with a rotary kinetic power source, related operation and transmission interface devices, and loading wheel sets driven by the rotary kinetic power source, and that may further be installed according to actually needs with non-powered wheels that are not driven by the rotary kinetic power source (P100), thereby jointly carrying the common load body (L100).

According to the present invention, the driving system having epicycle gear sets with dual output ends equipped with individually-controlled multiple speed-ratio device can be applied in a vehicle or an industry-used, agriculture-used or specially-designed carrier with front wheel drive, rear wheel drive, four wheel drive, multiple wheel drive, or a belt drive installed at two sides.

In the driving system having epicycle gear sets with dual output ends equipped with individually-controlled multiple speed-ratio device, a limited slip differential or a stabilizer device composed of a dual shaft connecting device having slip coupling torque can be installed at opposite locations horizontally and coaxially defined at two sides along the driving direction of the common load body (L100) and between the same transmission operation sets, so that when differential operation is performed between the two loads, the stabilizer device serves to stabilize the operation of the drive system. The stabilizer device includes a limited slip differential, or a coupling torque dual shaft connecting device composed of a coupling device having slip damping, e.g., a dual shaft structure configured to provide a fluid viscous effect, a hydrodynamic damping effect, a mechanical friction effect, an electromagnetic vortex effect, or a power generation reverse torque effect. Two rotating ends of the stabilizer device may be respectively connected to the transmission operation sets at one or more than one of horizontally and coaxially opposite locations, as follows:
(1) installed between wheel set rotating parts oppositely at the left side and the right side;
(2) installed between opposite output ends of the controlled multiple speed-ratio devices at the left side and the right side;
(3) installed between opposite output ends of clutch devices at the left side and the right side;
(4) installed between the input end or the output end oppositely at the left side and the right side of a transmission device; or
(5) installed between a wheel set rotating part at the left side and the a wheel set rotating part at the right side.

By optionally installing a stabilizer device as required for stabilizing the driving operation, when the load varies at individual loading ends, control is required by the operation states of the opposite controlled multiple speed-ratio devices, or an unstable state occurs during operation, the stabilizer device will serve to stabilize the system.

A stepped or continuously variable transmission, or a transmission having fixed speed ratios for acceleration or deceleration or changing directions can be further installed at one or more than one of following locations, including:
(1) installed at the input ends of the controllable multiple speed-ratio devices;
(2) installed at the output ends of the controllable multiple speed-ratio devices;
(3) installed at the input ends of the clutch devices;
(4) installed at the output ends of the clutch devices;
(5) installed at the input ends of the wheel sets at the loading end;

The transmission may include mechanical gear sets, chain sets, pulley sets, or linkage rod sets, and may be composed of a transmission device having fixed speed ratio for acceleration or deceleration or changing direction, or a manually-operated, automatic, or semi-automatic speed-ratio-varying or belt type continuously variable transmission, or a hydraulic torque converter, as required.

A clutch device can be further installed at one or more than one of following locations, including:
(1) installed at the input ends of the controllable multiple speed-ratio devices;
(2) installed at the output ends of the controllable multiple speed-ratio devices;
(3) installed at the input ends of the transmission devices;
(4) installed at the output ends of the transmission devices;
(5) installed at the input ends of the wheel sets at the loading end;

The clutch devices may be controlled by manual force or centrifugal force, or controlled by an operation interface, and can serve as a clutch device or structure having a function of performing transmission engaging or releasing while being driven by electric force, magnetic force, mechanical force, pressure, and/or hydraulic force, and has a rotary input end and a rotary output end. The output end clutch device may further include a function of being driven by electric force, magnetic force, mechanical force, pressure, and/or hydraulic force for controlling the coupling torque between engaging and releasing, e.g. an electromagnetic wet type multi-plate clutch device controlling coupling torque through excitation current, or a wet type multi-plate clutch device driven by mechanical force, pressure, and/or hydraulic force;

The structure of the output end clutch device includes:
(1) a clutch device or structure driven by electric force, magnetic force, mechanical force, air pressure, and/or hydraulic force for performing transmission engaging or releasing;
(2) driven by electric force, magnetic force, mechanical force, air pressure, and/or hydraulic force for linearly controlling the continuous coupling torque between transmission engaging and releasing;
(3) driven by electric force, magnetic force, mechanical force, air pressure, and/or hydraulic force for performing transmission engaging or releasing, and having a limited torque coupling function smaller than the engaging torque, after being released;
(4) driven by electric force, magnetic force, mechanical force, air pressure, and/or hydraulic force for performing transmission engaging or releasing, and having a linear damping function smaller than the engaging torque and that is increased when the rotation differential is increased, after being released;
(5) driven by electric force, magnetic force, mechanical force, air pressure, and/or hydraulic force for performing transmission engaging or releasing, and having a linear damping function smaller than the engaging torque and that is reduced when the rotation differential is increased, after being released;
(6) (1) to (5) including a radial clutch device;
(7) (1) to (5) including an axial clutch device;

The clutch device can be optionally installed according to actual needs.

Embodiments according to the present invention are illustrated as follows:

FIG. 1 is a schematic view illustrating a common load body (L100) installed with a first epicyclic gear set (EG101) driven by the rotary kinetic power of a rotary kinetic power source (P100), a controllable multiple speed-ratio device (VT100) installed between a left end output shaft (1011) of the first epicyclic gear set (EG101) and a wheel set (W100) at the left side of the loading end, and a controllable multiple speed-ratio device (VT200) installed between a right end output shaft (1012) and a wheel set (W200) at the right side, according to a first embodiment of the present invention.

As shown in FIG. 1, the present invention utilizes the rotary output end of the rotary kinetic power source (P100) of the common load body (L100), directly or through the transmission device (T101), to drive the first epicyclic gear set (EG101). The controllable multiple speed-ratio device (VT100) is installed between the left end output shaft (1011) of the two output ends of the first epicyclic gear set (EG101) and the wheel set (W100) at the left side of the loading end of the common load body (L100), and the controllable multiple speed-ratio device (VT200) is installed between the right end output shaft (1012) of the two output ends of the first epicyclic gear set (EG101) and the wheel set (W200) at the right side, thereby forming a drive system capable of being operated in a differential speed and variable speed state. and that includes:

rotary kinetic power source (P100): constituted by a power source outputting kinetic power through rotation, e.g. an internal combustion engine, external combustion engine, spring power source, hydraulic power source, pressure power source, flywheel power source, power source that utilizes manual force, animal force, and/or wind power, and/or a power source that is composed of an AC or DC, brush or brushless, synchronous or non-synchronous, internal rotating or external rotating type rotary motor installed with relative control devices and electrically driven by a power supply and/or storage device; the output end rotary kinetic power source (P100) outputting the rotary kinetic power directly or outputting through a clutch device;

input end clutch device (CL101): installed between the output end of the rotary kinetic power source (P100) and the input end of a first transmission device (T101), and capable of controlling the rotary kinetic power source (P100) to control the transmission or termination of the rotary kinetic power of the first transmission device (T101), the input end clutch device (CL101) being controlled by manual force or centrifugal force, or controlled through the operation interface (MI100), and driven by electric force, magnetic force, mechanical force, air pressure, and/or hydraulic force for performing transmission engaging or releasing, and having a rotating input end and a rotating output end; the input end clutch device (CL101) being optionally installed as required;

transmission device (T101): constituted by a transmission device having a fixed speed ratio, variable speed ratio, or continuously variable speed and consisting of mechanical gear sets, chain sets, pulley sets, or linkage rod sets, and installed between the rotary kinetic power source (P100) and the first epicyclic gear set (EG101); the transmission device (T101) can be optionally adopted as required;

first epicyclic gear set (EG101): constituted by an epicyclic gear set having an input shaft and two output shafts capable of differentially operating, and directly driven by the rotary kinetic power provided by an engine, or driven by the engine through the transmission device (T101); the left end output shaft (1011) of the two output shafts being capable of differentially operating to drive the input end of the controllable multiple speed-ratio device (VT100), and the right end output shaft (1012) driving the input end of the controllable multiple speed-ratio device (VT200);

controllable multiple speed-ratio devices (VT100), (VT200): the output end of the controllable multiple speed-ratio device (VT100) driving the wheel set (W100) at the left side of the loading end, and the input end of the controllable multiple speed-ratio device (VT100) being driven by the rotary kinetic power from the left end output shaft (1011) at the output end of the first epicyclic gear set (EG101); the output end of the controllable multiple speed-ratio device (VT200) driving the wheel set (W200) at the right side, and the input end of the controllable multiple speed-ratio device (VT200) being driven by the rotary kinetic power from the right end output shaft (1012) at the output end of the first epicyclic gear set (EG101); the controllable multiple speed-ratio device (VT100) and the controllable multiple speed-ratio device (VT200) including mechanical gear sets, chain sets, pulley sets, or linkage rod sets, and being structured as a multiple-step transmission device for acceleration or deceleration or changing direction, e.g., as an automatic type, automated manual type, manumatic type, mechanical clutch switching type, electric clutch switching type, pressure switching type, oil pressure switching type controllable multiple speed-ratio device controlled by manual force or by the control unit (ECU100);

operation interface (MI100): constituted by a mechanical operation device controlled by manual force or a system and structured by a linear analog type, digital type, or hybrid type electromechanical device and/or a solid state electric circuit, and provided for directly controlling the rotary kinetic power source (P100), the operation speed ratios of the controllable multiple speed-ratio device (VT100), and/or the controllable multiple speed-ratio device (VT200), or for controlling the control unit (ECU100) so as to further control the operation state of the rotary kinetic power source (P100), and/or to control the operation speed ratios of the controllable multiple speed-ratio device (VT100) and/or the controllable multiple speed-ratio device (VT200);

control unit (ECU100): constituted by electromechanical devices, electric circuit components, power semiconductors, and/or microprocessors and software, for being connected to an electric power source (B100) and controlled by the operation interface (MI100) or operated through a signal of controlling system operation state, for controlling the operation state of the rotary kinetic power source (P100), and/or for controlling the operation speed ratios of the controllable multiple speed-ratio device (VT100) and/or the controllable multiple speed-ratio device (VT200);

stabilizer device (SDT100): constituted by a limited slip differential, or a dual shaft connecting device composed of a coupling device having slip damping coupling torque, including a stabilizer device with a dual shaft structure configured to provide stabilization through a fluid viscous effect, hydrodynamic damping effect, mechanical friction effect, electromagnetic vortex effect, or power generation reverse torque effect; wherein two rotating ends of the stabilizer are respectively connected between the wheel set (W100) at the left side and the wheel set (W200) at the right side of the loading end such that during a driving operation, if the load varying at the individual two sides of the loading end causes unstable operation, the slip damping coupling torque of the stabilizer device (SDT100) installed between the wheel sets at the left and right sides will stabilize the operation of the system; the stabilizer device (SDT100) can be optionally installed according to actual needs;

According to the embodiment disclosed in FIG. 1, the input end or the output end of the controllable multiple speed-ratio device or the input end of the wheel set can be further installed with a transmission device, wherein:

the output ends of the transmission device (T100), (T200) drive the wheel set (W100) at the left side of the loading end, and the input end thereof is driven by the rotary kinetic power from the output end of the controllable multiple speed-ratio device (VT100). The output end of the transmission device (T200) drives the wheel set (W200) at the right side, and the input end of the transmission device (T200) is driven by the rotary kinetic power from the output end of the controllable multiple speed-ratio device (VT200). The transmission device (T100) and the transmission device (T200) may include mechanical gear sets, chain sets, pulley sets or linkage rod sets, and is structured as a multiple-step transmission device for acceleration or deceleration or changing direction, e.g., as an automatic type, automated manual type, manumatic type, mechanical clutch switching type, electric clutch switching type, pressure switching type, or oil pressure switching type multiple speed-ratio device controlled by manual force or by the control unit (ECU100), or a structural configuration capable of automatically changing speed ratio through being passively driven by the driving rotational speed and/or the loading torque, or a continuously variable transmission capable of automatically changing speed ratio through being externally controlled, e.g. a rubber belt type, metal belt type, or chain type continuous variable transmission, or an eddy current type continuously variable transmission, torque converter, or electric continuously variable transmission (ECVT), or friction disk type, or conventional uncoaxial continuous variable transmission; the transmission device (T100), (T200) can be optionally installed according to actual needs;

According to the embodiment shown in FIG. 1, between the output end of the controllable multiple speed-ratio device individually installed on an individual wheel set and the loading end, a clutch device can be further installed to the transmission chain of the input end of the wheel set used for distal driving, wherein:

output end clutch device (CL100), (CL200): the output end clutch device (CL100) is installed between the output end of the controllable multiple speed-ratio device (VT100) and the wheel set (W100) for controlling the controllable multiple speed-ratio device (VT100) to output the rotary kinetic power to the wheel set (W100), and the output end clutch device (CL200) is installed between the output end of the controllable multiple speed-ratio device (VT200) and the wheel set (W200) for controlling the controllable multiple speed-ratio device (VT200) to output the rotary kinetic power to the wheel set (W200); the output end clutch device (CL100) and the output end clutch device (CL200) being controlled by manual force or centrifugal force, or controlled through the operation interface (MI100) and the control unit (ECU100), and formed as a clutch device or structure driven by electric force, magnetic force, mechanical force, air pressure, and/or hydraulic force for performing transmission engaging or releasing, and having a rotating input end and a rotating output end; the output end clutch device further being driven by electric force, magnetic force, mechanical force, air pressure, and/or hydraulic force for controlling the coupling torque between engaging and releasing, e.g., an electromagnetic wet type multi-plate clutch controlling coupling torque through magnetic excitation current, or a wet type multi-plate clutch driven by mechanical force, air pressure, and/or hydraulic force.

The structure of the output end clutch device (CL100), (CL200) includes:

(1) a clutch device or structure driven by electric force, magnetic force, mechanical force, air pressure, and/or hydraulic force for performing transmission engaging or releasing;

(2) driven by electric force, magnetic force, mechanical force, air pressure, and/or hydraulic force for linearly controlling the continuous coupling torque between transmission engaging and releasing;

(3) driven by electric force, magnetic force, mechanical force, air pressure, and/or hydraulic force for performing transmission engaging or releasing, and having a torque limited coupling function smaller than the engaging torque, after being released;

(4) driven by electric force, magnetic force, mechanical force, air pressure, and/or hydraulic force for performing transmission engaging or releasing, and having a linear damping function smaller than the engaging torque that increases when the rotation differential is increased, after being released;

(5) driven by electric force, magnetic force, mechanical force, air pressure, and/or hydraulic force for performing transmission engaging or releasing, and having a linear damping function smaller than the engaging torque and that is reduced when the rotation differential is increased, after being released;

(6) (1) to (5) including a radial clutch device;

(7) (1) to (5) including an axial clutch device;

The output end clutch device (CL100), (CL200) can be optionally installed according to actual needs;

the common load body (L100) can be provided with one or more than one non-powered wheels according to actual needs.

With the operation of the above-mentioned devices, when the common load body (L100) is driven to operate by the rotary kinetic power source (P100), and the wheel set (W100) at the left side and the wheel set (W200) at the right side of the loading end are operated at different speeds, the speed ratios of the controllable multiple speed-ratio device (VT100) and the controllable multiple speed-ratio device (VT200) are individually adjusted along with the load varying of the wheel set (W100) and the wheel set (W200) of the loading end, and the two output ends of the first epicyclic gear set (EG101) perform differential operation for adjustment, so as to achieve a differential speed between the input end of the controllable multiple speed-ratio device (VT100) and the input end of the controllable multiple speed-ratio device (VT200). Alternatively, the operation interface (MI100) may be used to control the control unit (ECU100) so as to control the individual speed ratio adjustment between the controllable multiple speed-ratio device (VT100) and the controllable multiple speed-ratio device (VT200).

Figure 2:
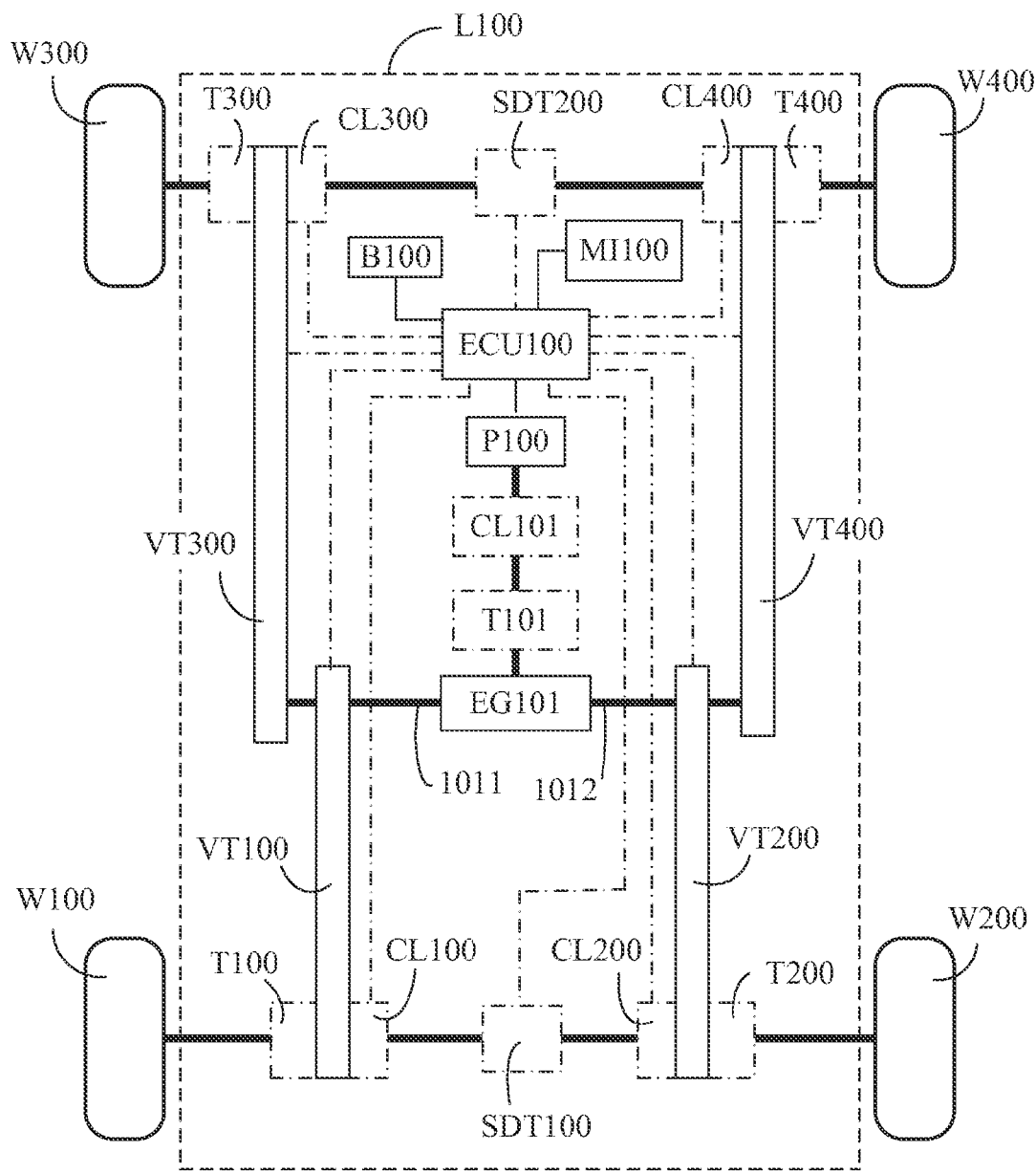
FIG. 2 is a schematic view illustrating a second embodiment of the present invention.

FIG. 2 is schematic view illustrating a controllable multiple speed-ratio device (VT100) and a controllable multiple speed-ratio device (VT300) individually installed between the left end output shaft (1011) of the first epicyclic gear set (EG101) of FIG. 1 and the wheel set (W100) at the rear left side and the wheel set (W300) at the front left side of the loading end, and a controllable multiple speed-ratio device (VT200) and a controllable multiple speed-ratio device (VT400) being individually installed between the right end output shaft (1012) and the wheel set (W200) at the rear right side and the wheel set (W400) at the front right side of the loading end, according to a second embodiment of the present invention.

As shown in FIG. 2, the present invention utilizes the rotary output end of the rotary kinetic power source (P100) of the common load body (L100) to directly, or through the transmission device (T101), drive the first epicyclic gear set (EG101). The controllable multiple speed-ratio device (VT100) and the controllable multiple speed-ratio device (VT300) are respectively installed between the left end output shaft (1011) of the two output ends of the first epicyclic gear set (EG101) and the wheel set (W100) at the rear left side and the wheel set (W300) at the front left side of the loading end at the left side of the common load body (L100), and the controllable multiple speed-ratio device (VT200) and the controllable multiple speed-ratio device (VT400) are installed between the right end output shaft (1012) and the wheel set (W200) at the rear right side and the wheel set (W400) at the front right side of the loading end at the right side of the common load body (L100), thereby forming a drive system capable of being operated in a speed differential state and that includes:

rotary kinetic power source (P100): constituted by a power source outputting kinetic power through rotation, e.g. an internal combustion engine, external combustion engine, spring power source, hydraulic power source, pressure power source, flywheel power source, power source driven by manual force or animal force, wind power source, and/or power source composed of an AC or DC, brush or brushless, synchronous or non-synchronous, internal rotating or external rotating type rotary motor installed with relative control devices and electrically driven by a power supply and/or storage device; the output end thereof outputting the rotary power directly or through a clutch device;

input end clutch device (CL101): installed between the output end of the rotary kinetic power source (P100) and the input end of the first transmission device (T101), and capable of controlling the rotary kinetic power source (P100) to control the transmission or termination of the rotary kinetic power to the first transmission device (T101); the input end clutch device (CL101) being controlled by manual force or centrifugal force, or controlled through the operation interface (MI100), and driven by electric force, magnetic force, mechanical force, air pressure, and/or hydraulic force for performing transmission engaging or releasing, and having a rotating input end and a rotating output end; the input end clutch device (CL101) can be optionally installed according to actual needs;

transmission device (T101): constituted by a transmission device having a fixed speed ratio, variable speed ratio, or continuously variable speed and including mechanical gear sets, chain sets, pulley sets, or linkage rod sets, and installed between the rotary kinetic power source (P100) and the first epicyclic gear set (EG101); the transmission device (T101) can be optionally adopted according to actual needs;

first epicyclic gear set (EG101): constituted by an epicyclic gear set having an input shaft and two output shafts capable of differentially operating and being directly driven by the rotary kinetic power provided by an engine, or driven by the engine through the transmission device (T101); the left end output shaft (1011) of the two output shafts capable of differentially operating to drive the input ends of the controllable multiple speed-ratio device (VT100) and the controllable multiple speed-ratio device (VT300), and the right end output shaft (1012) driving the input ends of the controllable multiple speed-ratio device (VT200) and the controllable multiple speed-ratio device (VT400);

controllable multiple speed-ratio devices (VT100), (VT200), (VT300), (VT400): the output end of the controllable multiple speed-ratio device (VT100) driving the wheel set (W100) at the left side of the loading end, and the input end of the controllable multiple speed-ratio device (VT100) being driven by the rotary kinetic power from the left end output shaft (1011) at the output end of the first epicyclic gear set (EG101); the output end of the controllable multiple speed-ratio device (VT200) driving the wheel set (W200) at the right side, and the input end of the controllable multiple speed-ratio device (VT200) being driven by the rotary kinetic power from the right end output shaft (1012) at the output end of the first epicyclic gear set (EG101); the output end of the controllable multiple speed-ratio device (VT300) driving the wheel set (W300) at the left side of the loading end, and the input end of the controllable multiple speed-ratio device (VT300) being driven by the rotary kinetic power from the left end output shaft (1011) at the output end of the first epicyclic gear set (EG101); the output end of the controllable multiple speed-ratio device (VT400) serving to drive the wheel set (W400) at the right side, and the input end of the controllable multiple speed-ratio device (VT400) being driven by the rotary kinetic power from the right end output shaft (1012) at the output end of the first epicyclic gear set (EG101); the controllable multiple speed-ratio device (VT100), the controllable multiple speed-ratio device (VT200), the controllable multiple speed-ratio device (VT300) and the controllable multiple speed-ratio device (VT400) each including mechanical gear sets, chain sets, pulley sets, or linkage rod sets, and structured as a multiple-step transmission device for acceleration or deceleration or changing direction, e.g. as an automatic type, automated manual type, manumatic type, mechanical clutch switching type, electric clutch switching type, air pressure switching type, or oil pressure switching type controllable multiple speed-ratio device controlled by manual force or by the control unit (ECU100);

operation interface (MI100): constituted by a mechanical operation device controlled by manual force or the drive system, and structured by a linear analog type, digital type, or hybrid type electromechanical device and/or solid state electric circuit, and provided for directly controlling the rotary kinetic power source (P100), and/or the operation speed ratios of the controllable multiple speed-ratio device (VT100), the controllable multiple speed-ratio device (VT200), the controllable multiple speed-ratio device (VT300), and/or the controllable multiple speed-ratio device (VT400), or for controlling the control unit (ECU100) so as to control the operation state of the rotary kinetic power source (P100), and/or control the operation speed ratios of the controllable multiple speed-ratio device (VT100), the controllable multiple speed-ratio device (VT200), the controllable multiple speed-ratio device (VT300), and/or the controllable multiple speed-ratio device (VT400);

control unit (ECU100): constituted by electromechanical devices, electric circuit components, power semiconductors, and/or microprocessors and software, for being connected to an electric power source (B100) and controlled by the operation interface (MI100) or operated through a signal of the controlling system operation state, for controlling the operation state of the rotary kinetic power source (P100), controlling the operation speed ratios of the controllable multiple speed-ratio device (VT100), the controllable multiple speed-ratio device (VT200), the controllable multiple speed-ratio device (VT300), and/or the controllable multiple speed-ratio device (VT400);

stabilizer device (SDT100), (STD200): constituted by a limited slip differential, or a dual shaft connecting device composed of a coupling device having slip damping coupling torque, including a stabilizer device with a dual shaft structure that operates through a fluid viscous effect, a hydrodynamic damping effect, a mechanical friction effect, an electromagnetic vortex effect or power generation reverse torque effect; wherein two rotating ends of the stabilize device (SDT100) are respectively connected between the wheel set (W100) at the rear left side and the wheel set (W200) at the rear right side of the loading end, and two rotating ends of the stabilize device (SDT200) are respectively connected between the wheel set (W300) at the front left side and the wheel set (W400) at the front right side of the loading end such that during a driving operation, if the load varying at the individual two sides of the loading end causes unstable operation, then as a result of the slip damping coupling torque of the stabilizer device (SDT100) and/or the stabilizer device (SDT200) installed between the two opposite wheel sets at the left and right sides, the operation of the system can be stabilized; the stabilize device (SDT100) and/or the stabilize device (SDT200) can be optionally installed according to actual needs.

According to the embodiment disclosed in FIG. 2, the input end or the output end of the controllable multiple speed-ratio device or the input end of the wheel set can be further installed with a transmission device, wherein:

for transmission devices (T100), (T200), (T300), (T400): the output end of the transmission device (T100) drives the wheel set (W100) at the rear left side of the loading end, and the input end thereof is driven by the rotary kinetic power from the output end of the controllable multiple speed-ratio device (VT100); the output end of the transmission device (T200) drives the wheel set (W200) at the rear right side, and the input end thereof is driven by the rotary kinetic power from the output end of the controllable multiple speed-ratio device (VT200); the output end of (T300) drives the wheel set (W300) at the front left side of the loading end, and the input end thereof is driven by the rotary kinetic power from the output end of the controllable multiple speed-ratio device (VT300); the output end of the transmission device (T400) drives the wheel set (W400) at the front right side, and the input end thereof is driven by the rotary kinetic power from the output end of the controllable multiple speed-ratio device (VT400); the transmission devices (T100), (T200), (T300), (T400) including mechanical gear sets, chain sets, pulley sets, or linkage rod sets, and being structured as a multiple-step transmission device for acceleration or deceleration or changing direction, e.g. as an automatic type, automated manual type, manumatic type, mechanical clutch switching type, electric clutch switching type, pressure switching type, or oil pressure switching type controllable multiple speed-ratio device controlled by manual force or by the control unit (ECU100), or a structural configuration capable of automatically changing speed ratio through being passively driven by the driving rotational speed and/or the loading torque, or a continuously variable transmission capable of automatically changing speed ratio through being externally controlled, e.g. a rubber belt type, metal belt type, chain type continuous variable transmission, or eddy current type continuously variable transmission, or a torque converter, electric continuously variable transmission (ECVT), friction disk type continuously variable transmission, or conventional non-coaxial continuously variable transmission; the transmission device (T100), (T200) and/or (T300), (T400) can be optionally installed according to actual needs;

According to the embodiment disclosed in FIG. 2, between the output end of the controllable multiple speed-ratio device individually installed on an individual wheel set and the loading end, a clutch device can be further installed between the output end of the controllable multiple speed-ratio device and the transmission chain of the input end of the wheel set used for distal driving, wherein:

output end clutch device (CL100), (CL200), (CL300), (CL400): the output end clutch device (CL100) is installed between the output end of the controllable multiple speed-ratio device (VT100) and the wheel set (W100) for controlling the controllable multiple speed-ratio device (VT100) to output the rotary kinetic power to the wheel set (W100), the output end clutch device (CL200) is installed between the output end of the controllable multiple speed-ratio device (VT200) and the wheel set (W200) for controlling the controllable multiple speed-ratio device (VT200) to output the rotary kinetic power to the wheel set (W200), the output end clutch device (CL300) is installed between the output end of the controllable multiple speed-ratio device (VT300) and the wheel set (W300) for controlling the controllable multiple speed-ratio device (VT300) to output the rotary kinetic energy to the wheel set (W300), and the output end clutch device (CL400) is installed between the output end of the controllable multiple speed-ratio device (VT400) and the wheel set (W400) for controlling the controllable multiple speed-ratio device (VT400) to output the rotary kinetic energy to the wheel set (W400); the output end clutch devices (CL100), (CL200), (CL300), (CL400) being controlled by manual force or centrifugal force, or controlled through the operation interface (MI100) and the control unit (ECU100), and driven by electric force, magnetic force, mechanical force, air pressure, and/or hydraulic force for performing transmission engaging or releasing, the output end clutch devices further having a rotating input end and a rotating output end; the output end clutch device further being driven by electric force, magnetic force, mechanical force, air pressure, and/or hydraulic force for controlling the coupling torque between engaging and releasing, e.g. an electromagnetic wet type multi-plate clutch controlling coupling torque through magnetic excitation current, or a wet type multi-plate clutch driven by mechanical force, pressure and/or hydraulic force.

The structure of the output end clutch device (CL100), (CL200), (CL300), (CL400) includes:

(1) a clutch device or structure driven by electric force, magnetic force, mechanical force, air pressure, and/or hydraulic force for performing transmission engaging or releasing;

(2) a clutch device or structure driven by electric force, magnetic force, mechanical force, air pressure, and/or hydraulic force for linearly controlling the continuous coupling torque between transmission engaging and releasing;

(3) a clutch device or structure driven by electric force, magnetic force, mechanical force, air pressure, and/or hydraulic force for performing transmission engaging or releasing, and having a torque limited coupling function smaller than that of the engaging torque, after being released;

(4) a clutch device or structure driven by electric force, magnetic force, mechanical force, air pressure, and/or hydraulic force for performing transmission engaging or releasing, and having a linear damping function smaller than the engaging torque and that is increased when the rotation differential is increased, after being released;

(5) driven by electric force, magnetic force, mechanical force, air pressure, and/or hydraulic force for performing transmission engaging or releasing, and having a linear damping function smaller than the engaging torque and that is reduced when the rotation differential being increased, after being released;

(6) (1) to (5) including a radial clutch device;

(7) (1) to (5) including an axial clutch device;

The output end clutch devices (CL100), (CL200), (CL300), (CL400) can be optionally installed according to actual needs;

common load body (L100) can be provided with one or more than one non-powered wheels according to actual needs;

With the operation of the mentioned devices, when the common load body (L100) is driven to operate by the rotary kinetic power source (P100), and the wheel set (W100) at the rear left side and the wheel set (W200) at the rear right side of the loading end are operated at different speeds, the speed ratios of the controllable multiple speed-ratio device (VT100) and the controllable multiple speed-ratio device (VT200) are individually adjusted along with the load varying of the wheel set (W100) and the wheel set (W200) of the loading end, and the two output ends of the first epicyclic gear set (EG101) perform differential operation for adjustment, so as to enable differential speed driving between the input end of the controllable multiple speed-ratio device (VT100) and the input end of the controllable multiple speed-ratio device (VT200); when the wheel set (W300) at the front left side and the wheel set (W400) at the front right side of the loading end are operated at different speeds, the speed ratios of the controllable multiple speed-ratio device (VT300) and the controllable multiple speed-ratio device (VT400) are individually adjusted along with the load varying of the wheel set (W300) and the wheel set (W400) of the loading end, and the left end output shaft (1011) and the right end output shaft (1012) of the two output ends of the first epicyclic gear set (EG101) perform differential operation for adjustment so as to enable differential speed driving between the input end of the controllable multiple speed-ratio device (VT300) and the input end of the controllable multiple speed-ratio device (VT400); if the operation at different speeds are performed between the wheel set (W100) and the wheel set (W200) and between the wheel set (W300) and the wheel set (W400) at the same time, the interactive differential operation is jointly formed between the controllable multiple speed-ratio device (VT100) and the controllable multiple speed-ratio device (VT200) and between the controllable multiple speed-ratio device (VT300) and the controllable multiple speed-ratio device (VT400), and between the left end output shaft (1011) and the right end output shaft (1012) of the two output ends of the first epicyclic gear set (EG101), or the operation interface (MI100) is used to control the control unit (ECU100) so as to control the individual speed ratio adjustment between the controllable multiple speed-ratio device (VT100), the controllable multiple speed-ratio device (VT200), the controllable multiple speed-ratio device (VT300) and the controllable multiple speed-ratio device (VT400).

According to the driving system having epicycle gear sets with dual output ends equipped with individually-controlled multiple speed-ratio devices illustrated in FIG. 1 and FIG. 2, when more wheel sets share the same epicyclic gear set having an individual controlled multiple speed-ratio device at the loading end, the structured system can be formed with the same means disclosed above, optionally including the limited slip differential or the stabilizer device composed of the dual shaft connecting device having slip coupling torque installed at opposite locations horizontally and coaxially defined at two sides along the driving direction of the common load body (L100) and between the same transmission operation sets, and also optionally including the transmission device installed between the individual controlled multiple speed-ratio device and the wheel sets, and all, some, or none of the clutch devices.

Figure 3:
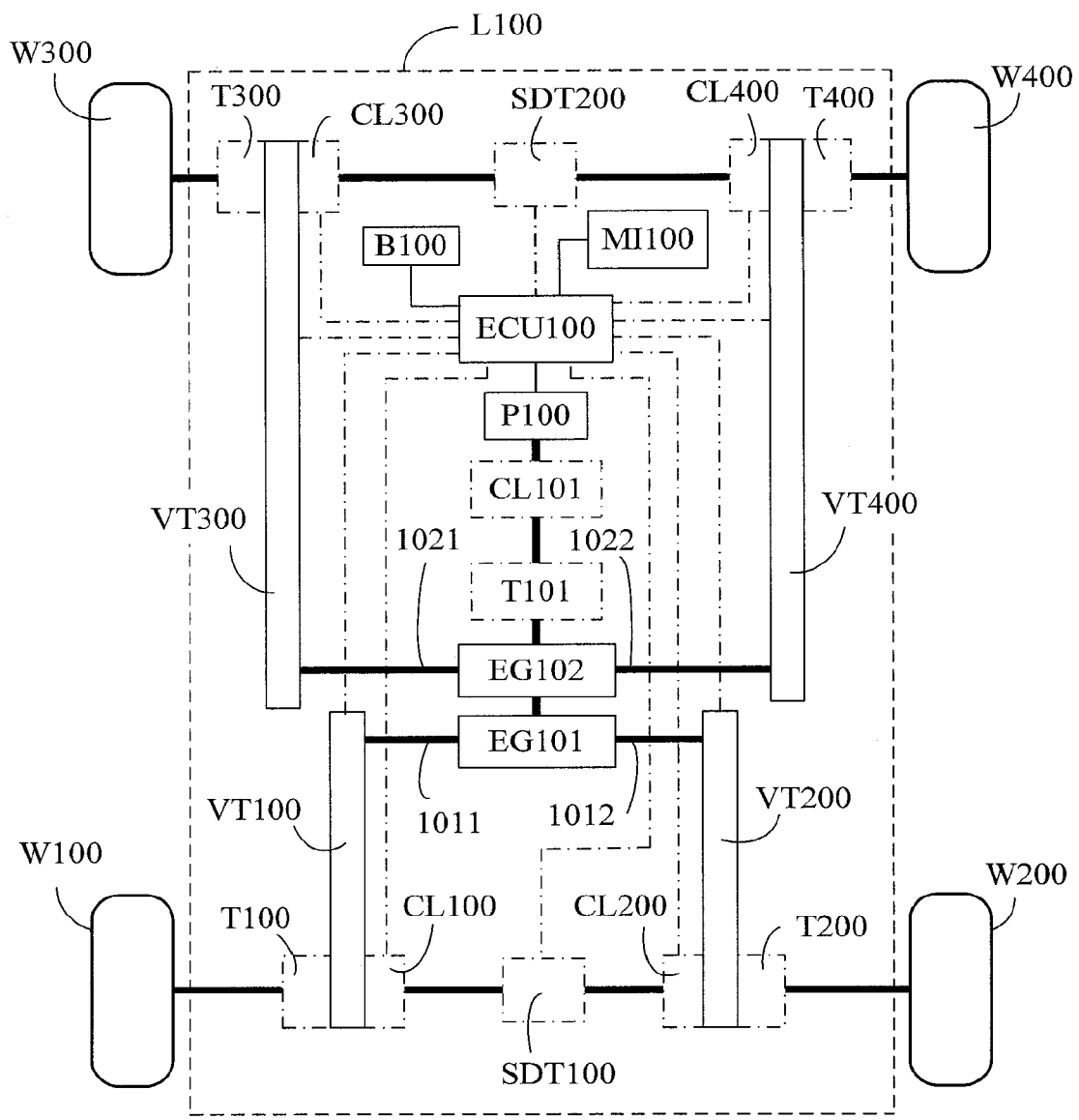
FIG. 3 is a schematic view a variation of the embodiment of FIG. 2 according to a third embodiment of the present invention.

FIG. 3 is a schematic view illustrating the driving device of FIG. 2 further installed with a first epicyclic gear seat (EG101) and a second epicyclic gear set (EG102) driven by the rotary kinetic power of the rotary kinetic power source (P100), and a controllable multiple speed-ratio device (VT100) installed between the left end output shaft (1011) of the first epicyclic gear set (EG101) and the wheel set (W100) at the rear left side of the loading end, a controllable multiple speed-ratio device (VT200) installed between the right end output shaft (1012) and the wheel (W200) at the rear right side, and a controllable multiple speed-ratio device (VT300) installed between the left end output shaft (1021) of the second epicyclic gear set (EG102) and the wheel set (W300) at the front left side, and a controllable multiple speed-ratio device (VT400) installed between the right end output shaft (1022) and the wheel set (W400) at the front right side, according to a third embodiment of the present invention.

As shown in FIG. 3, the present invention utilizes the rotary output end of the rotary kinetic power source (P100) of the common load body (L100), directly or through the transmission device (T101), to drive the first epicyclic gear set (EG101), the controllable multiple speed-ratio device (VT100) is individually installed between the left end output shaft (1011) of the two output ends of the first epicyclic gear set (EG101) and the wheel set (W100) at the rear left side of the loading end at the left side of the common load body (L100), the controllable multiple speed-ratio device (VT200) is individually installed between the right end output shaft (1012) of the two output ends of the first epicyclic gear set (EG101) and the wheel set (W200) at the rear right side of the loading end at the right side of the common load body (L100). The rotary output end of the rotary kinetic power source (P100), directly or through the transmission device (T101), drives the second epicyclic gear set (EG102), the controllable multiple speed-ratio device (VT300) is individually installed between the left end output shaft (1021) of the two output ends of the second epicyclic gear set (EG102) and the wheel set (W300) at the front left side of the loading end at the left side of the common load body (L100), and the controllable multiple speed-ratio device (VT400) is individually installed between the right end output shaft (1022) and the wheel set (W400) at the front right side of the loading end at the right side of the common load body (L100), thereby forming a drive system capable of being operated in a differential speed state, the drive system including:

rotary kinetic power source (P100): constituted by a power source outputting kinetic power through rotation, e.g. an internal combustion engine, external combustion engine, spring power source, hydraulic power source, pressure power source, flywheel power source, power source that uses manual force or animal force, wind power source, and/or a power source composed of an AC or DC, brush or brushless, synchronous or non-synchronous, internal rotating or external rotating type rotary motor installed with relative control devices and electrically driven by power supply and/or storage device; the output end thereof outputting rotary power directly or through a clutch device;

input end clutch device (CL101): installed between the output end of the rotary kinetic power source (P100) and the input end of the first transmission device (T101), and capable of controlling the rotary kinetic power source (P100) to control the transmission or termination of the rotary kinetic power to the first transmission device (T101); the input end clutch device (CL101) being controlled by manual force or centrifugal force, or being controlled through the operation interface (MI100), and driven by electric force, magnetic force, mechanical force, air pressure, and/or hydraulic force for performing transmission engaging or releasing, and having a rotating input end and a rotating output end; the input end clutch device (CL101) being optionally installed according to actual needs;

transmission device (T101): constituted by a transmission device having fixed speed ratio or variable speed ratio or continuously variable speed ratios and including mechanical gear sets, chain sets, pulley sets, or linkage rod sets installed between the rotary kinetic power source (P100) and the first epicyclic gear set (EG101) and second epicyclic gear set (EG102); the transmission device (T101) being optionally adopted according to actual needs;

first epicyclic gear set (EG101): constituted by an epicyclic gear set having an input shaft and two output shafts capable of differentially operating, and directly driven by the rotary kinetic power provided by an engine, or driven by the engine through the transmission device (T101); the left end output shaft (1011) of the two output shafts capable of differentially operating driving the input end of the controllable multiple speed-ratio device (VT100), and the right end output shaft (1012) driving the input end of the controllable multiple speed-ratio device (VT200);

second epicyclic gear set (EG102): constituted by an epicyclic gear set having an input shaft and two output shafts capable of differentially operating, and directly driven by the rotary kinetic power provided by an engine, or driven by the engine through the transmission device (T101); the left end output shaft (1021) of the two output shafts capable of differentially operating driving the input end of the controllable multiple speed-ratio device (VT300), and the right end output shaft (1022) driving the input end of the controllable multiple speed-ratio device (VT400);

controllable multiple speed-ratio device (VT100), (VT200), (VT300), (VT400): the output end of the controllable multiple speed-ratio device (VT100) drives the wheel set (W100) at the left side of the loading end, and the input end of the controllable multiple speed-ratio device (VT100) is driven by the rotary kinetic power from the left end output shaft (1011) at the output end of the first epicyclic gear set (EG101); the output end of the controllable multiple speed-ratio device (VT200) drives the wheel set (W200) at the right side, and the input end of the controllable multiple speed-ratio device (VT200) is driven by the rotary kinetic power from the right end output shaft (1012) at the output end of the first epicyclic gear set (EG101); the output end of the controllable multiple speed-ratio device (VT300) drives the wheel set (W300) at the left side of the loading end, and the input end of the controllable multiple speed-ratio device (VT300) is driven by the rotary kinetic power from the left end output shaft (1021) at the output end of the second epicyclic gear set (EG102); the output end of the controllable multiple speed-ratio device (VT400) drives the wheel set (W400) at the right side, and the input end of the controllable multiple speed-ratio device (VT400) is driven by the rotary kinetic power from the right end output shaft (1022) at the output end of the second epicyclic gear set (EG102); the controllable multiple speed-ratio device (VT100), the controllable multiple speed-ratio device (VT200), the controllable multiple speed-ratio device (VT300) and the controllable multiple speed-ratio device (VT400) including mechanical gear sets, chain sets, pulley sets, or linkage rod sets structured as a multiple-step transmission device for acceleration or deceleration or changing direction, e.g. an automatic type, automated manual type, manumatic type, mechanical clutch switching type, or electric clutch switching type, or pressure switching type, or oil pressure switching type controllable multiple speed-ratio device controlled by manual force or by the control unit (ECU100);

operation interface (MI100): constituted by a mechanical operation device controlled by manual force or by the drive system, and structured by a linear analog, digital, or hybrid type electromechanical device and/or a solid state electric circuit, the operation interface (MI100) directly controlling the rotary kinetic power source (P100), and/or the operation speed ratios of the controllable multiple speed-ratio device (VT100), the controllable multiple speed-ratio device (VT200), the controllable multiple speed-ratio device (VT300), and/or the controllable multiple speed-ratio device (VT400), or controlling the control unit (ECU100) so as to control the operation state of the rotary kinetic power source (P100) and/or to control the operation speed ratios of the controllable multiple speed-ratio device (VT100), the controllable multiple speed-ratio device (VT200), the controllable multiple speed-ratio device (VT300), and/or the controllable multiple speed-ratio device (VT400);

control unit (ECU100): constituted by electromechanical devices, electric circuit components, power semiconductors, and/or microprocessors and software connected to an electric power source (B100) and controlled by the operation interface (MI100) or operated through a controlling system operation state signal, for controlling the operation state of the rotary kinetic power source (P100), and/or for controlling the operation speed ratios of the controllable multiple speed-ratio device (VT100), the controllable multiple speed-ratio device (VT200), the controllable multiple speed-ratio device (VT300), and/or the controllable multiple speed-ratio device (VT400);

stabilizer device (SDT100), (STD200): constituted by a limited slip differential, or a dual shaft connecting device composed of a coupling device having slip damping coupling torque, the stabilizer device having a dual shaft structure that operates through a viscous fluid effect, hydrodynamic damping effect, mechanical friction effect, electromagnetic vortex effect, or power generation reverse torque effect; wherein two rotating ends of the stabilizer device (SDT100) are respectively connected between the wheel set (W100) at the rear left side and the wheel set (W200) at the rear right side of the loading end, and two rotating ends of the stabilizer device (SDT200) are respectively connected between the wheel set (W300) at the front left side and the wheel set (W400) at the front right side of the loading end; such that during a driving operation, if the load variation at the individual two sides of the loading end causes unstable operation, the operation is stabilized by the slip damping coupling torque of the stabilizer device (SDT100) and/or the stabilize device (SDT200) installed between the two opposite wheel sets at the left and right sides; the stabilizer device (SDT100) and/or the stabilize device (SDT200) being optionally installed according to actual needs.

According to the embodiment disclosed in FIG. 3, the input end or the output end of the controllable multiple speed-ratio device or the input end of the wheel set can be further installed with a transmission device (T100), (T200), (T300), (T400), wherein:

the output end of the transmission device (T100) drives the wheel set (W100) at the rear left side of the loading end, and the input end thereof is driven by the rotary kinetic power from the output end of the controllable multiple speed-ratio device (VT100); the output end of the transmission device (T200) drives the wheel set (W200) at the rear right side, and the input end thereof is driven by the rotary kinetic power from the output end of the controllable multiple speed-ratio device (VT200); the output end of (T300) drives the wheel set (W300) at the front left side of the loading end, and the input end thereof is driven by the rotary kinetic power from the output end of the controllable multiple speed-ratio device (VT300); the output end of the transmission device (T400) drives the wheel set (W400) at the front right side, and the input end thereof is driven by the rotary kinetic power from the output end of the controllable multiple speed-ratio device (VT400); the transmission devices (T100), (T200), (T300), (T400) including mechanical gear sets, chain sets, pulley sets or linkage rod sets structured as a multiple-step transmission device for acceleration or deceleration or changing direction, e.g. an automatic type, automated manual or manumatic type, mechanic clutch switching type, electric clutch switching type, pressure switching type, or oil pressure switching type controllable multiple speed-ratio device controlled by manual force or by the control unit (ECU100), or a structural configuration capable of automatically changing speed ratio through being passively driven by the driving rotational speed and/or the loading torque, or a continuous variable transmission capable of automatically changing speed ratio through being externally controlled, e.g. a rubber belt type, metal belt type, or chain type continuously variable transmission, eddy current type continuously variable transmission, torque converter, electric continuously variable transmission (ECVT), or friction disk type or conventional non-coaxial continuously variable transmission; the transmission device (T100), (T200) and/or (T300), (T400) being optionally installed according to actual needs.

According to the embodiment disclosed in FIG. 3, between the output end of the controllable multiple speed-ratio device individually installed on an individual wheel set and the loading end, a clutch device can be further installed between the output end of the controllable multiple speed-ratio device and the transmission chain of the input end of the wheel set used for distal driving, wherein:

output end clutch device (CL100), (CL200), (CL300), (CL400): the output end clutch device (CL100) is installed between the output end of the controllable multiple speed-ratio device (VT100) and the wheel set (W100) for controlling the controllable multiple speed-ratio device (VT100) to output the rotary kinetic power to the wheel set (W100), the output end clutch device (CL200) is installed between the output end of the controllable multiple speed-ratio device (VT200) and the wheel set (W200) for controlling the controllable multiple speed-ratio device (VT200) to output the rotary kinetic power to the wheel set (W200), the output end clutch device (CL300) is installed between the output end of the controllable multiple speed-ratio device (VT300) and the wheel set (W300) for controlling the controllable multiple speed-ratio device (VT300) to output the rotary kinetic energy to the wheel set (W300), and the output end clutch device (CL400) is installed between the output end of the controllable multiple speed-ratio device (VT400) and the wheel set (W400) for controlling the controllable multiple speed-ratio device (VT400) to output the rotary kinetic energy to the wheel set (W400); the output end clutch devices (CL100), (CL200), (CL300), (CL400) being controlled by manual force or centrifugal force, or controlled through the operation interface (MI100) and the control unit (ECU100), and driven by electric force, magnetic force, mechanical force, air pressure, and/or hydraulic force for performing transmission engaging or releasing, the clutch device having a rotating input end and a rotating output end; the output end of the clutch device further being driven by electric force, magnetic force, mechanical force, air pressure, and/or hydraulic force for controlling the coupling torque between engaging and releasing, e.g. an electromagnetic wet type multi-plate clutch controlling coupling torque through magnetic excitation current, or a wet type multi-plate clutch driven by mechanical force and/or pressure and/or hydraulic force.

The structure of the output end clutch device (CL100), (CL200), (CL300), (CL400) includes:

(1) a clutch device or structure driven by electric force, magnetic force, mechanical force, air pressure, and/or hydraulic force for performing transmission engaging or releasing;

(2) a clutch device or structure driven by electric force, magnetic force, mechanical force, air pressure, and/or hydraulic force for linearly controlling the continuous coupling torque between transmission engaging and releasing;

(3) a clutch device or structure driven by electric force, magnetic force, mechanical force, air pressure, and/or hydraulic force for performing transmission engaging or releasing, and having a torque limited coupling function smaller than the engaging torque, after being released;

(4) a clutch device or structure driven by electric force, magnetic force, mechanical force, air pressure, and/or hydraulic force for performing transmission engaging or releasing, and having a linear damping function smaller than the engaging torque and that is increased when the rotation differential is increased, after being released;

(5) a clutch device or structure driven by electric force, magnetic force, mechanical force, air pressure, and/or hydraulic force for performing transmission engaging or releasing, and having a linear damping function smaller than the engaging torque and that is reduced when the rotation differential is increased, after being released;

(6) (1) to (5) including a radial clutch device;

(7) (1) to (5) including an axial clutch device;

The output end clutch devices (CL100), (CL200), (CL300), (CL400) can be optionally installed according to actual needs.

Common load body (L100) can be provided with one or more than one non-powered wheels according to actual needs.

As a result of the operation of the above-described devices, when the common load body (L100) is driven to operate by the rotary kinetic power source (P100), and the wheel set (W100) at the rear left side and the wheel set (W200) at the rear right side of the loading end are operated at different speeds, the speed ratios of the controllable multiple speed-ratio device (VT100) and the controllable multiple speed-ratio device (VT200) are individually adjusted along with the load variation of the wheel set (W100) and the wheel set (W200) of the loading end, and the two output ends of the first epicyclic gear set (EG101) perform differential operation for adjustment, so as to enable differential speed driving between the input end of the controllable multiple speed-ratio device (VT100) and the input end of the controllable multiple speed-ratio device (VT200); when the wheel set (W300) at the front left side and the wheel set (W400) at the front right side of the loading end are operated at differential speeds, the speed ratios of the controllable multiple speed-ratio device (VT300) and the controllable multiple speed-ratio device (VT400) are individually adjusted along with the load variations of the wheel set (W300) and the wheel set (W400) of the loading end, and the left end output shaft (1021) and the right end output shaft (1022) of the two output ends of the second epicyclic gear set (EG102) perform differential operation for adjustment so as to enable differential speed driving between the input end of the controllable multiple speed-ratio device (VT300) and the input end of the controllable multiple speed-ratio device (VT400), or the operation interface (MI100) is used to control the control unit (ECU100) so as to control individual speed ratio adjustments between the controllable multiple speed-ratio device (VT100), the controllable multiple speed-ratio device (VT200), the controllable multiple speed-ratio device (VT300) and the controllable multiple speed-ratio device (VT400).

The driving system of FIG. 3 is an example of a driving system having epicycle gear sets with dual output ends equipped with individually-controlled multiple speed-ratio devices that, when applied in a loading end wheel set having more individual epicyclic gear sets and controlled multiple speed-ratio devices, can be formed with the same means disclosed above, including the optional limited slip differential or stabilizer device composed of the dual shaft connecting device having slip coupling torque and installed at opposite locations horizontally and coaxially defined at two sides along the driving direction of the common load body (L100) and between the same transmission operation sets, and also including the optional transmission device installed between the controllable multiple speed-ratio device and the wheel set, and one, more than one, or none of the optional clutch device.

According to the driving system having epicycle gear sets with dual output ends equipped with individually-controlled multiple speed-ratio devices, a direction changing signal sensor (S100) can be further installed, so that when changing directions, the signal of the direction changing signal sensor (S100) can be sent to the control unit (ECU100) for controlling the relative speed ratio switching of the controllable multiple speed-ratio device (VT100) and the controllable multiple speed-ratio device (VT200), thereby enhancing the performance of the drive for changing direction. Taking the embodiment disclosed in FIG. 1 installed with the direction changing signal sensor (S100) as an example, the embodiments disclosed in FIG. 2 and FIG. 3 can also include such a direction changing signal sensor.

Figure 4:
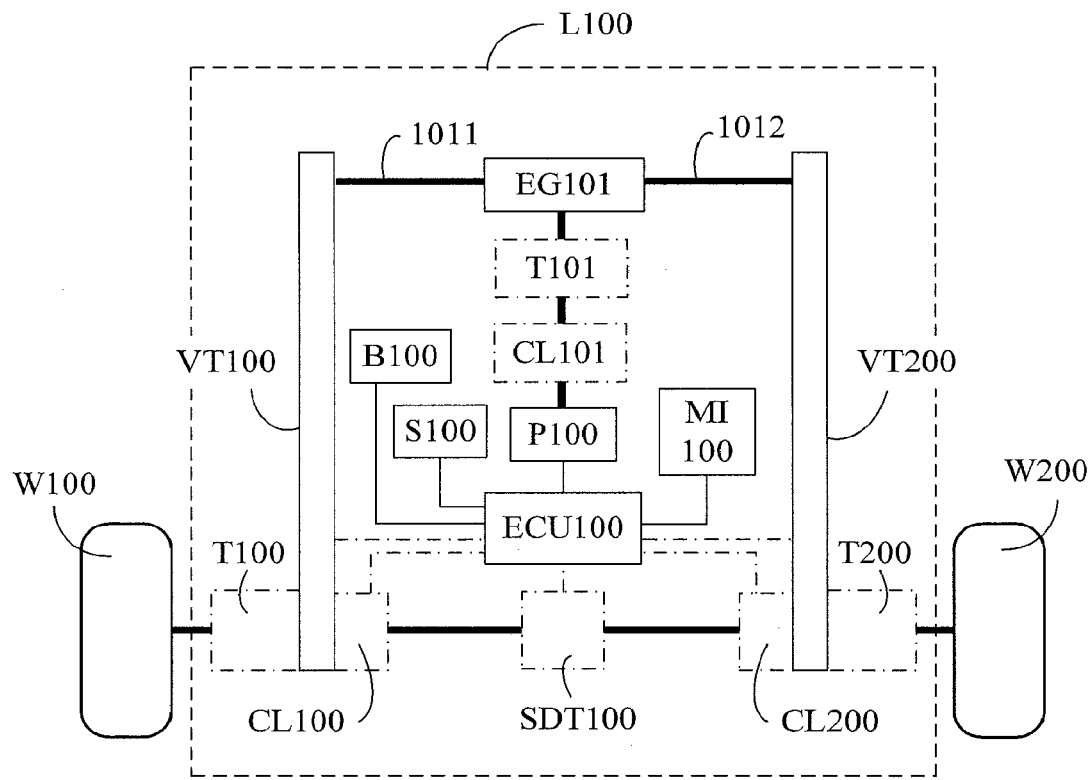
FIG. 4 is a schematic view illustrating a variation of the embodiment of FIG. 1 according to a fourth embodiment of the present invention.

FIG. 4 is a schematic view illustrating an embodiment in which the drive system of FIG. 1 is further installed with a direction changing signal sensor (S100) to send a signal to the control unit (ECU100) for controlling the relative speed ratio switching of the controllable multiple speed-ratio device (VT100) and the controllable multiple speed-ratio device (VT200), according to a fourth embodiment of the present invention.

As shown in FIG. 4, the present invention utilizes the rotary output end of the rotary kinetic power source (P100) of the common load body (L100) to directly, or through the transmission device (T101), drive the first epicyclic gear set (EG101). The controllable multiple speed-ratio device (VT100) is installed between the left end output shaft (1011) of the two output ends of the first epicyclic gear set (EG101) and the wheel set (W100) at the left side of the loading end of the common load body (L100), and the controllable multiple speed-ratio device (VT200) is installed between the right end output shaft (1012) of the two output ends of the first epicyclic gear set (EG101) and the wheel set (W200) at the right side, thereby forming a drive system capable of being operated in a differential and variable speed state, the drive system including:

rotary kinetic power source (P100): constituted by a power source outputting kinetic power through rotation, e.g. an internal combustion engine, external combustion engine, spring power source, hydraulic power source, pressure power source, flywheel power source, manual or animal power force, wind power source, and/or a power source composed of an AC or DC, brush or brushless, synchronous or non-synchronous, internal rotating or external rotating type rotary motor installed with relative control devices and electrically driven by a power supply and/or storage device; the output end of the rotary kinetic power source (P100) outputting rotary power directly or through a clutch device;

input end clutch device (CL101): installed between the output end of the rotary kinetic power source (P100) and the input end of the first transmission device (T101), and capable of controlling the rotary kinetic power source (P100) to control transmission or termination of the rotary kinetic power to the first transmission device (T101); the input end clutch device (CL101) being controlled by manual force or centrifugal force, or being controlled through the operation interface (MI100), and driven by electric force, magnetic force, mechanical force, air pressure, and/or hydraulic force for performing transmission engaging or releasing, the clutch device having a rotating input end and a rotating output end; the input end clutch device (CL101) being optionally installed according to actual needs;

transmission device (T101): constituted by a transmission device having a fixed speed ratio, variable speed ratio, or continuously variable speed and including mechanical gear sets, chain sets, pulley sets, or linkage rod sets; and installed between the rotary kinetic power source (P100) and the first epicyclic gear set (EG101); the transmission device (T101) being optionally adopted according to actual needs;

first epicyclic gear set (EG101): constituted by an epicyclic gear set having an input shaft and two output shafts capable of differentially operating, directly driven by the rotary kinetic power provided by an engine, or driven by the engine through the transmission device (T101); the left end output shaft (1011) of the two output shafts driving the input end of the controllable multiple speed-ratio device (VT100), and the right end output shaft (1012) driving the input end of the controllable multiple speed-ratio device (VT200);

controllable multiple speed-ratio device (VT100), (VT200): the output end of the controllable multiple speed-ratio device (VT100) drives the wheel set (W100) at the left side of the loading end, and the input end of the controllable multiple speed-ratio device (VT100) is driven by the rotary kinetic power from the left end output shaft (1011) at the output end of the first epicyclic gear set (EG101); the output end of the controllable multiple speed-ratio device (VT200) drives the wheel set (W200) at the right side, and the input end of the controllable multiple speed-ratio device (VT200) is driven by the rotary kinetic power from the right end output shaft (1012) at the output end of the first epicyclic gear set (EG101); the controllable multiple speed-ratio device (VT100) and the controllable multiple speed-ratio device (VT200) including mechanical gear sets, chain sets, pulley sets, or linkage rod sets structured as a multiple-step transmission device for acceleration or deceleration or changing direction, e.g. an automatic type, automated manual or manumatic type, mechanical clutch switching type, electric clutch switching type, pressure switching type, or oil pressure switching type multiple speed-ratio device controlled by manual force or by the control unit (ECU100);

operation interface (MI100): constituted by a mechanical operation device control by manual force or the drive system, and structured by a linear analog, digital, or hybrid type electromechanical device and/or solid state electric circuit, provided for directly controlling the rotary kinetic power source (P100), and/or the operation speed ratios of the controllable multiple speed-ratio device (VT100) and/or the controllable multiple speed-ratio device (VT200), or for controlling the control unit (ECU100) so as to control the operation state of the rotary kinetic power source (P100), and/or control the operation speed ratios of the controllable multiple speed-ratio device (VT100) and/or the controllable multiple speed-ratio device (VT200);

control unit (ECU100): constituted by electromechanical devices, electric circuit components, power semiconductors, and/or microprocessors and software, for being connected to an electric power source (B100) and controlled by the operation interface (MI100) or controlled by the direction changing signal sensor (S100) responsive to a controlling system operation state signal, for controlling the operation state of the rotary kinetic power source (P100), and/or controlling the operation speed ratios of the controllable multiple speed-ratio device (VT100) and/or the controllable multiple speed-ratio device (VT200);

direction changing signal sensor (S100): constituted by one or more physical sensing device, for sensing direction-changing detection signals including one or more of the following signals including: signals of direction changing degree from a steering mechanism, signals of inclined angle of the vehicle body, signals of vehicle idling, signals of upward/downward slope, signals of acceleration or deceleration, the signals being transmitted together with a signal from the operation interface (MI100) to the control unit (ECU100);

stabilizer device (SDT100): constituted by a limited slip differential, or a dual shaft connecting device composed of a coupling device having slip damping coupling torque, and having a dual shaft structure configured to provide damping through a fluid viscous effect, hydrodynamic damping effect, mechanical friction effect, electromagnetic vortex effect, or power generation reverse torque effect; wherein two rotating ends of the stabilizer device are respectively connected between the wheel set (W100) at the left side and the wheel set (W200) at the right side of the loading end; such that during the driving operation, if the load variation at the individual two sides of the loading end causes unstable operation, the slip damping coupling torque of the stabilize device (SDT100) installed between the wheel sets at the left and right sides will stabilize the operation of the system; the stabilizer device (SDT100) being optionally installed according to actual needs.

According to the embodiment disclosed in FIG. 4, the input end or the output end of the combined multiple speed-ratio device or the input end of the wheel set can be further installed with a transmission device (T100, T200), wherein:

the output end of the transmission device (T100) drives the wheel set (W100) at the left side of the loading end, and the input end thereof is driven by the rotary kinetic power from the output end of the controllable multiple speed-ratio device (VT100); the output end of the transmission device (T200) drives the wheel set (W200) at the right side, and the input end thereof is driven by the rotary kinetic power from the output end of the controllable multiple speed-ratio device (VT200); the transmission device (T100) and the transmission device (T200) including mechanical gear sets, chain sets, pulley sets, or linkage rod sets structured as a multiple-step transmission device for acceleration or deceleration or changing direction, e.g. an automatic type, automated manual type, manumatic type, mechanical clutch switching type, electric clutch switching type, pressure switching type, or oil pressure switching type controllable multiple speed-ratio device controlled by manual force or by the control unit (ECU100), or a structural configuration capable of automatically changing speed ratio upon being passively driven by the driving rotational speed and/or the loading torque, or a continuously variable transmission capable of automatically changing speed ratio upon being externally controlled, e.g. a rubber belt type, metal belt type, or chain type continuously variable transmission, an eddy current type continuously variable transmission, a torque converter, an electric continuously variable transmission (ECVT), or a friction disk type or conventional non-coaxial continuously variable transmission; the transmission devices (T100), (T200) being optionally installed according to actual needs;

According to the embodiment disclosed in FIG. 4, between the output end of the controllable multiple speed-ratio device individually installed on individual wheel set and the loading end, a clutch device (CL11), (CL200) can be further installed between the output end of the controllable multiple speed-ratio device and the transmission chain of the input end of the wheel set used for distal driving, wherein:

the output end clutch device (CL100) is installed between the output end of the controllable multiple speed-ratio device (VT100) and the wheel set (W100) for controlling the controllable multiple speed-ratio device (VT100) to output the rotary kinetic power to the wheel set (W100), and the output end clutch device (CL200) is installed between the output end of the controllable multiple speed-ratio device (VT200) and the wheel set (W200) for controlling the controllable multiple speed-ratio device (VT200) to output the rotary kinetic power to the wheel set (W200); the output end clutch device (CL100) and the output end clutch device (CL200) being controlled by manual force or centrifugal force, or controlled through the operation interface (MI100) and the control unit (ECU100), and driven by electric force, magnetic force, mechanical force, air pressure, and/or hydraulic force for performing transmission engaging or releasing, the clutch device having a rotating input end and a rotating output end; the output end clutch device further being driven by electric force, magnetic force, mechanical force, air pressure, and/or hydraulic force for controlling the coupling torque between engaging and releasing, e.g. as an electromagnetic wet type multi-plate clutch controlling coupling torque through magnetic excitation current, or a wet type multi-plate clutch driven by mechanical force, pressure, and/or hydraulic force.

The structure of the output end clutch device (CL100), (CL200) includes:

(1) a clutch device or structure driven by electric force, magnetic force, mechanical force, air pressure, and/or hydraulic force for performing transmission engaging or releasing;

(2) a clutch device or structure driven by electric force, magnetic force, mechanical force, air pressure, and/or hydraulic force for linearly controlling the continuous coupling torque between transmission engaging and releasing;

(3) a clutch device or structure driven by electric force, magnetic force, mechanical force, air pressure, and/or hydraulic force for performing transmission engaging or releasing, and having a torque limited coupling function smaller than the engaging torque, after being released;

(4) a clutch device or structure driven by electric force, magnetic force, mechanical force, air pressure, and/or hydraulic force for performing transmission engaging or releasing, and having a linear damping function that is smaller than the engaging torque and increased when the rotation differential is increased, after being released;

(5) a clutch device or structure driven by electric force, magnetic force, mechanical force, air pressure, and/or hydraulic force for performing transmission engaging or releasing, and having a linear damping function that is smaller than the engaging torque and reduced when the rotation differential is increased, after being released;

(6) (1) to (5) including a radial clutch device;

(7) (1) to (5) including an axial clutch device.

The output end clutch devices (CL100), (CL200) can be optionally installed according to actual needs.

The common load body (L100) can be provided with one or more than one non-powered wheels according to actual needs.

Due to the operation of the above-described devices, when the common load body (L100) is driven to operate by the rotary kinetic power source (P100), and the wheel set (W100) at the left side and the wheel set (W200) at the right side of the loading end are operated at different speeds, the speed ratios of the controllable multiple speed-ratio device (VT100) and the controllable multiple speed-ratio device (VT200) are individually adjusted along with the load varying of the wheel set (W100) and the wheel set (W200) of the loading end, and the two output ends of the first epicyclic gear set (EG101) perform differential operation for adjustment, so as to perform differential speed operation between the input end of the controllable multiple speed-ratio device (VT100) and the input end of the controllable multiple speed-ratio device (VT200), or the operation interface (MI100) is used to control the control unit (ECU100) so as to control the individual speed ratio adjustment between the controllable multiple speed-ratio device (VT100) and the controllable multiple speed-ratio device (VT200).

Figure 5:
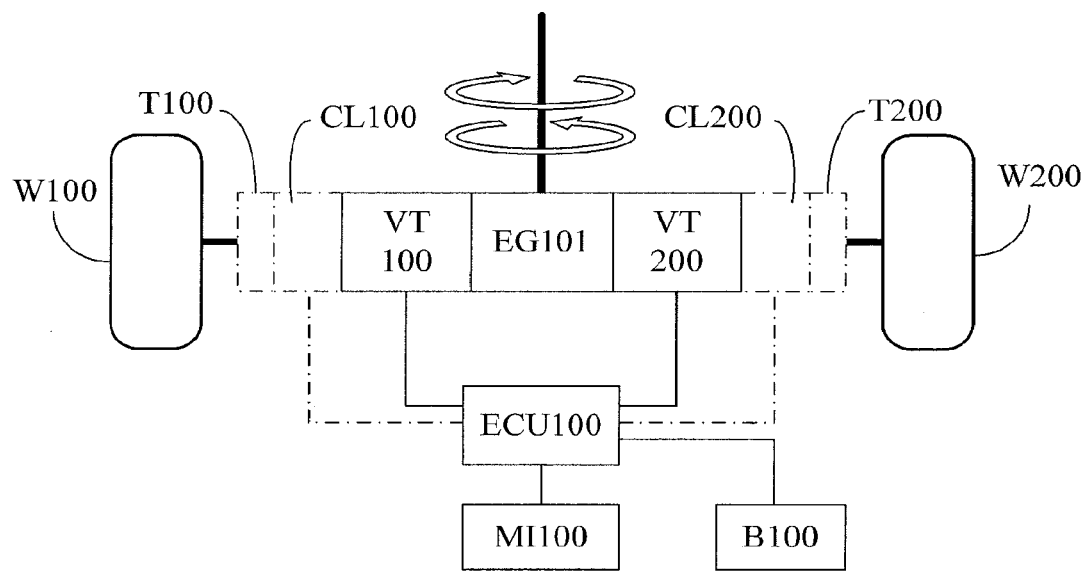
FIG. 5 is a block diagram illustrating a fifth embodiment of the present invention.

The driving system having epicycle gear sets with dual output ends equipped with individually-controlled multiple speed-ratio devices can be further configured as a co-structure, as shown in FIG. 5, which is a block diagram illustrating a structure in which the controllable multiple speed-ratio device (VT100) and the controllable multiple speed-ratio device (VT200), the output end clutch devices (CL100), (CL200), and the transmission devices (T100), (T200) are combined at two output sides of the first epicyclic gear set (EG101), according to a fifth embodiment of the present invention.

In the co-structure shown in FIG. 5, the controllable multiple speed-ratio device (VT100) and the controllable multiple speed-ratio device (VT200), the output end clutch devices (CL100), (CL200), and the transmission devices (T100), (T200) are combined at the two output ends of the first epicyclic gear set (EG101).

Figure 6:
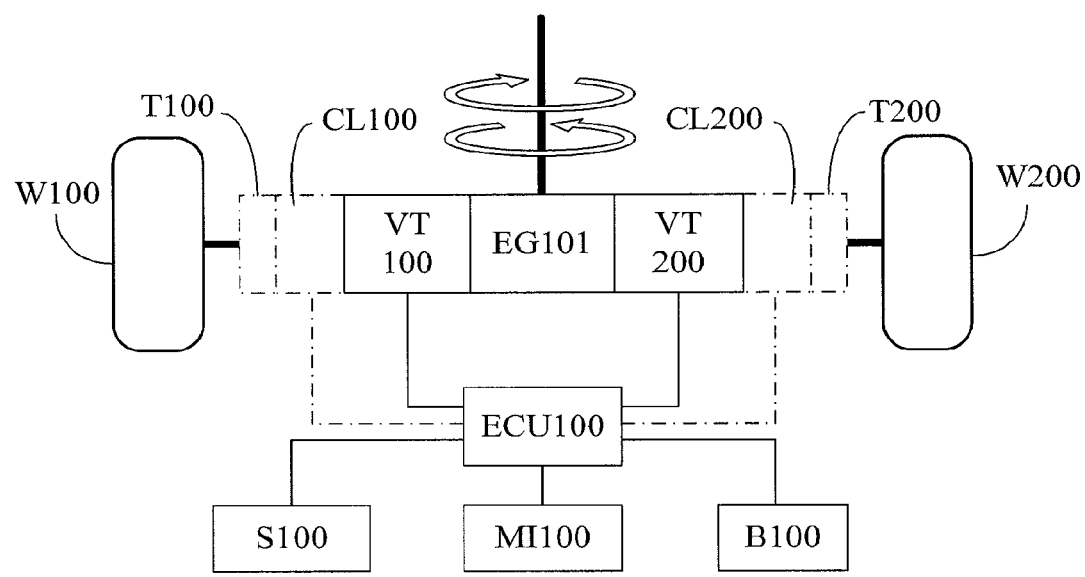
FIG. 6 is a schematic view illustrating a variation of the embodiment of FIG. 5 according to a sixth preferred embodiment of the present invention.

FIG. 6 is a schematic view showing a sixth embodiment of the present invention in which the co-structure of FIG. 5 is installed with a direction changing signal sensor (S100) to send a signal to the control unit (ECU100) for controlling the relative speed ratio switching of the controllable multiple speed-ratio device (VT100) and the controllable multiple speed-ratio device (VT200).

As shown in FIG. 6, the signal of the direction changing signal sensor (S100) is sent to the control unit (ECU100) for controlling the relative speed ratio switching of the controllable multiple speed-ratio device (VT100) and the controllable multiple speed-ratio device (VT200), wherein direction changing signal sensor (S100) is constituted by one or more than one physical sensing devices, for sensing detection signals that indicate direction changing and that may include one or more of the following signals: signals of direction changing degree from a steering mechanism, signals of inclined angle of the vehicle body, signals of vehicle idling, signals of upward/downward slope, or signals of acceleration or deceleration, the direction-change signals being transmitted together with a signal from the operation interface (MI100) to the control unit (ECU100).

FIG. 1 to FIG. 5 and FIG. 6 show examples of driving systems having epicycle gear sets with dual output ends equipped with individually-controlled multiple speed-ratio devices to which more loading end wheel sets may be added while otherwise still applying the same means disclosed above.

Moreover, an output end transmission device composed of a stepped or continuous transmission device having a fixed speed ratio for acceleration or deceleration or changing direction can be further installed between the output end of the first transmission device (T101) and the individual loading end wheel set; the output end transmission device being composed of mechanical gear sets, chain sets, pulley sets, or linkage rod sets and structured as a transmission device having fixed speed ratio for acceleration, deceleration, or direction changing, a manually-operated, automatic, or semi-automatic speed ratio or belt type continuously variable transmission, or a hydraulic type torque converter.

In the driving system having epicycle gear sets with dual output ends equipped with individually-controlled multiple speed-ratio devices of the present invention, the location where the output end clutch device is individually installed between the output end of the first transmission device (T101)

and the individual transmission wheel system of an individual loading end wheel set may include one or more of the following:
(1) installed between the output end of the first transmission device (T101) and the input end of the individual output end transmission device;
(2) installed at the input end of the output end transmission device;
(3) installed at the output end of the output end transmission device;
(4) installed in series between internal power transmission sets of the individual output end transmission device;
(5) installed at the input end of the loading end wheel set.

The output end clutch device may be controlled by manual force or centrifugal force, or controlled through the operation interface, and driven by electric force, magnetic force, mechanical force, air pressure, and/or hydraulic force for performing transmission engaging or releasing, the output end clutch device having a rotating input end and a rotating output end.

A flexible transmission device composed of the limited slip differential or the dual shaft connecting device having slip coupling torque can be further installed at opposite locations horizontally and coaxially on two sides along the driving direction of the common load body (L100) and between the same transmission operation sets, such that when a differential operation is performed between the wheel shaft and wheel set at the left side and the wheel shaft and wheel set at the right side (which are combined with the dual shafts of the flexible transmission device), e.g. when the differential operation is performed by the flexible transmission device while the common load body (L100) is making a turn, then by releasing the output end clutch device between the inner wheel set and the first transmission device (T101), the outer wheel set having a high rotational speed will carry out transmission with a rotary differential to the inner wheel set having low rotational speed through the flexible transmission device, such that the rotary speed of the inner wheel set is lower than that of the outer wheel set but still has the driving power; the flexible transmission device including a coupling torque dual shaft connecting device composed of a coupling device have slip damping, e.g., through a fluid viscous effect, hydrodynamic damping effect, mechanical friction effect, electromagnetic vortex effect, or power generation reverse torque effect, wherein two rotating ends of the flexible transmission device are respectively combined with transmission operation sets at one or more of the following horizontally and coaxially opposite locations:
(1) installed between the wheel shaft connecting the wheel set at the left side and the wheel set at the right side of the common load body (L100);
(2) installed between the opposite input ends of the output end transmission devices at the left and the right sides of the common load body (L100);
(3) installed between the opposite output ends of the output end clutch devices at the left and the right sides of the common load body (L100);
(4) installed between transmission components having the same rotational speed when in a normal straight running state, in the transmission wheel system of the output end transmission devices at the left and the right sides of the common load body (L100).

In this embodiment of the driving system having epicycle gear sets with dual output ends equipped with individually-controlled multiple speed-ratio devices, the limited slip differential or the flexible transmission device composed of the dual shaft connecting devices having slip coupling torque can optionally be installed at one, both, or none of the opposite locations horizontally and coaxially defined on two sides along the driving direction of the common load body (L100) and between the installed wheel sets and the drive operation sets.

The invention claimed is:

1. A driving system having an epicyclic gear set with dual output ends equipped with individually-controllable multiple speed-ratio devices, comprising:
   a rotary kinetic power source (P100);
   said epicyclic gear set (EG101);
   said individually-controllable multiple speed-ratio devices (VT100,VT200); wherein:
   rotary kinetic power output by the rotary kinetic power source (P100) drives the epicyclic gear set (EG101) and individually-controllable multiple speed-ratio devices (VT100,VT200) are installed between each of a left end output shaft (1011) and a right end output shaft (1012) of the epicyclic gear set (EG101) and respective individual loads including wheel sets (W100,W200), the respective individual loads being driven by respective ones of the two output shafts (1011,1012), so that the wheel sets (W100,W200) of the individual loads driven by the two output shafts (1011,1012) are enabled to perform variation of the driving speed ratio and the driving torque and drive a combined common load body (L100);
   the common load body (L100) is a frame body of a vehicle, on which is installed the rotary kinetic power source (P100), corresponding operation and transmission interface devices, and at least the loading wheel sets (W100,W200) driven by the rotary kinetic power source (P100);
   at least one transmission device (T100,T101,T200) having one of a fixed speed ratio for acceleration, deceleration, or changing direction, a manually-operated, automatic, or semi-automatic speed-ratio-varying continuously variable transmission, and a hydraulic torque converter, said at least one transmission device (T100,T101,T200) including at least one of a mechanical gear set, chain set, pulley set, and linkage rod set, and said at least one transmission device (T100,T101,T200) being installed at one or more of the following locations:
   (1) at input ends of the controllable multiple speed-ratio devices (VT100,VT200);
   (2) at output ends of the controllable multiple speed-ratio devices (VT100,VT200);
   (3) at input ends of clutch devices, said clutch devices including a clutch device on a left side (CL100) and a clutch device on a right side (CL200);
   (4) at an output end of one of the clutch devices (CL101); and
   (5) at input ends of the wheel sets (W100,W200) at a loading end,
   at least one of said clutch devices (CL100,CL101, CL200) is one of a manual or centrifugal clutch device, and a clutch controlled by an operation interface that engages or release an output end of the at least one clutch device (CL100,CL101,CL200) by at least one of an electric force, magnetic force, mechanical force, pressure, and hydraulic force, one or more of said at least one clutch devices (CL100, CL101,CL200) being installed at one of the following locations:
   (1) at the input ends of the controllable multiple speed-ratio devices (VT100,VT200);

(2) at the output ends of the controllable multiple speed-ratio devices (VT100,VT200);
(3) at an input end of one of the transmission devices (T101);
(4) at output ends of two of the transmission devices (T100,T200);
(5) at the input ends of the wheel sets (W100,W200) at the loading end, and one or more of the clutch devices (CL100,CL101, CL200) is further arranged to perform the following functions in response to said driving by at least one of an electric force, magnetic force, mechanical force, pressure, and hydraulic force:
(1) performing transmission engaging and release;
(2) linearly controlling the continuous coupling torque between transmission engaging and releasing;
(3) performing transmission engaging and release, and having a torque limited coupling torque smaller than the engaging torque, after a respective one of the clutch devices is released;
(4) performing transmission engaging and release, and having a linear damping force smaller than the engaging torque that is increased when a rotation differential is increased, after the respective one of the clutch devices is released;
(5) performing transmission engaging and release, and having a linear damping force smaller than the engaging torque that is reduced when the rotation differential is increased, after the respective one of the clutch devices is released;
(6) performing any of functions (1) to (5) by a radial clutch device;
(7) performing any of functions (1) to (5) by an axial clutch device.

2. A driving system having epicycle gear sets with dual output ends equipped with individually-controlled multiple speed-ratio devices as claimed in claim 1, wherein a stabilizer device (SDT100) composed of one of a limited slip differential and a dual shaft connecting device having slip coupling torque and connected to the drive system at the following horizontally and coaxially opposite locations on two sides of the common load body (L100), such that when a differential operation is performed between the two individual loads including wheel sets (W100,W200), the stabilizer device (SDT100) stabilizes operation of the drive system, the slip coupling torque being provided by one of a viscous fluid effect, hydrodynamic damping effect, mechanical friction effect, electromagnetic vortex effect, and power generation reverse torque effect, and the stabilizer device (SDT100) being installed between parts of driving system at left and right sides of the common load body (L100) in one of the following configurations:
(1) between rotating parts of the wheel sets (W100,W200) oppositely at the left side and the right side;
(2) between opposite output ends of the controllable multiple speed-ratio devices (VT100,VT200) at the left side and the right side;
(3) between opposite output ends of said clutch devices (CL100,CL200) at the left side and the right side;
(4) between input ends or output ends of said transmission devices (T100,T200) oppositely at the left side and the right side;
(5) between a left side rotating part of one of the wheel sets (W100) and a right side rotating part of another of the wheel sets (W200).

3. A driving system having epicycle gear sets with dual output ends equipped with individually-controlled multiple speed-ratio devices as claimed in claim 1, wherein said vehicle is one of an industrial, agricultural, and specially-designed carrier with at least one of a front wheel drive, rear wheel drive, four wheel drive, multiple wheel drive, and belt drive driven by belts installed at two sides.

4. A driving system having epicycle gear sets with dual output ends equipped with individually-controlled multiple speed-ratio devices as claimed in claim 1, wherein said clutch devices (CL100,CL101,CL200) include at least one of an electromagnetic wet type multi-plate clutch device controlling coupling torque through excitation current, and a wet type multi-plate clutch device driven by any of mechanical force, pressure, and hydraulic force.

5. A driving system having epicycle gear sets with dual output ends equipped with individually-controlled multiple speed-ratio devices as claimed in claim 1, wherein the rotary output end of the rotary kinetic power source (P100) installed on the common load body (L100) drives the epicyclic gear set (EG101) directly or through a first of the transmission devices (T101)), a first of the two controllable multiple speed-ratio devices (VT100) is installed between the left end output shaft (1011) of the epicyclic gear set (EG101) and a first of the two wheel sets (W100) at the left side of the loading end of the common load body (L100), and a second of the two controllable multiple speed-ratio devices (VT200) is installed between the right end output shaft (1012) of the epicyclic gear set (EG101) and a second of the two wheel sets (W200) at the right side of the loading end of the common load body (L100), thereby forming the drive system capable of being operated at different speeds and in a variable speed state, wherein:

the rotary kinetic power source (P100) is one of an internal combustion engine, external combustion engine, spring power source, hydraulic power source, pressure power source, flywheel power source, manually driven power source, wind power source, and power source composed of an AC or DC, brush or brushless, synchronous or non-synchronous, internal rotating or external rotating type rotary motor installed with relative control devices and supplied with electricity by at least one of an electrical power supply and electrical storage device;

an input end one of said clutch devices (CL101) is installed between the rotary kinetic power source (P100) and a first of the transmission devices (T101) for controlling transmission or termination of the rotary kinetic power from the rotary kinetic power source (P100) to the first transmission device (T101), the input end clutch device (CL101) is controlled by one of manual force, centrifugal force, or through an operation interface (MI100);

the first transmission device (T101) is installed between the rotary kinetic power source (P100) and the epicyclic gear set (EG101);

the left end output shaft (1011) of the epicyclic gear set (EG101) drives the input end of the first controllable multiple speed-ratio device (VT100), and the right end output shaft (1012) of the epicyclic gear set (EG101) drives the input end of the second controllable multiple speed-ratio device (VT200);

the output end of the first controllable multiple speed-ratio device (VT100) drives the first wheel set (W100) at the left side of the loading end, and the input end of the first controllable multiple speed-ratio device (VT100) is driven by the rotary kinetic power from the left end output shaft (1011) of the epicyclic gear set (EG101); the output end of the second controllable multiple speed-ratio device (VT200) drives the second wheel set (W200) at the right side, and the input end of the second controllable multiple speed-ratio device (VT200) is driven by the rotary kinetic power from the right end output shaft (1012) of the epicyclic gear set (EG101);

the first controllable multiple speed-ratio device (VT100) and the second controllable multiple speed-ratio device (VT200) include at least one of mechanical gear sets, chain sets, pulley sets, or linkage rod sets to provide a multiple-step transmission device for acceleration, deceleration, and changing direction, the multiple-step transmission device being one of an automatic type, automated manual or manumatic type, mechanical clutch switching type, electric clutch switching type, pressure switching type, and oil pressure switching type of controllable multiple speed-ratio device controlled by manual force or by the control unit (ECU100);

the operation interface (MI100) directly controls at least one of the rotary kinetic power source (P100), operation speed ratios of the first controllable multiple speed-ratio device (VT100), operation speed ratios of the second controllable multiple speed-ratio device (VT200), or controls at least one of the rotary kinetic power source (P100) and speed ratios of the first and second controllable multiple speed-ratio devices (VT100,VT200) through an control unit (ECU100);

the control unit (ECU100) is connected to an electric power source (B100) and controlled by the operation interface (MI100) or operated through a system operation state signal for controlling said at least one of the rotary kinetic power source (P100) and speed ratios of the first and second controllable multiple speed-ratio devices (VT100,VT200) through an control unit (ECU100);

a first output end one of the transmission devices (T100) drives the first wheel set (W100) at the left side of the loading end, and the input end thereof is driven by the rotary kinetic power from the output end of the first controllable multiple speed-ratio device (VT100); a second output end one of the transmission devices (T200) drives the second wheel set (W200) at the right side, and the input end thereof is driven by the rotary kinetic power from the output end of the second controllable multiple speed-ratio device (VT200); said first output end transmission device (T100) and second output end transmission device (T200) being configured to be controlled by manual force or by the control unit (ECU100), configured to automatically change speed ratios in response to one of a driving rotational speed or a loading torque, or configured as one of the following transmission devices capable of automatically changing speed ratio through being externally controlled: a rubber belt type, metal belt type, chain type, eddy current, friction disk type, or non-coaxial type continuously variable transmission, a torque converter, and an electric continuously variable transmission (ECVT);

a first output end one of the clutch devices (CL100) is installed between the output end of the first controllable multiple speed-ratio device (VT100) and the first wheel set (W100) for controlling the controllable multiple speed-ratio device (VT100) to output the rotary kinetic power to the first wheel set (W100), and a second output end one of the clutch devices (CL200) being installed between the output end of the second controllable multiple speed-ratio device (VT200) and the second wheel set (W200) for controlling the second controllable multiple speed-ratio device (VT200) to output the rotary kinetic power to the second wheel set (W200), and when the common load body (L100) is driven to operate by the rotary kinetic power source (P100), and the first wheel set (W100) at the left side and the second wheel set (W200) at the right side of the loading end are operated in different speeds, the speed ratios of the first controllable multiple speed-ratio device (VT100) and the second controllable multiple speed-ratio device (VT200) are individually adjusted in response to load variation of the first wheel set (W100) and the second wheel set (W200) of the loading end, and the two output ends of the epicyclic gear set (EG101) perform differential operation adjustment to differentially drive the input ends of the first controllable multiple speed-ratio device (VT100) and the second controllable multiple speed-ratio device (VT200), or the operation interface (MI100) is used to control the control unit (ECU100) so as to control the individual speed ratio adjustments between the first controllable multiple speed-ratio device (VT100) and the second controllable multiple speed-ratio device (VT200).

6. A driving system having epicycle gear sets with dual output ends equipped with individually-controlled multiple speed-ratio device as claimed in claim 5, wherein the first and second controllable multiple speed-ratio devices (VT100, VT200), the first and second output end clutch devices (CL100,CL200), and the output end transmission devices (T100,T200) installed at two sides of the common load body (L100) are combined at two output sides of the epicyclic gear set (EG101).

7. A driving system having epicycle gear sets with dual output ends equipped with individually-controlled multiple speed-ratio devices as claimed in claim 1, further comprising a third controllable multiple speed-ratio device (VT300) installed between the left end output shaft (1011) of the first epicyclic gear set (EG101) and a third wheel set (W300) at a front left side of the loading end of the common load body (L100), and fourth multiple speed-ratio device (VT400) installed between the right end output shaft (1012) and a fourth wheel set (W400) at the front right side of the loading end of the common load body (L100), wherein an output end of the third controllable multiple speed-ratio device (VT300) drives the third wheel set (W300) at the left side of the loading end, and the input end of the third controllable multiple speed-ratio device (VT300) is driven by the rotary kinetic power from the left end output shaft (1011) at the output end of the epicyclic gear set (EG101); the output end of the fourth controllable multiple speed-ratio device (VT400) drives the fourth wheel set (W400) at the right side, and the input end of the fourth controllable multiple speed-ratio device (VT400) is driven by the rotary kinetic power from the right end output shaft (1012) at the output end of the epicyclic gear set (EG101); the third controllable multiple speed-ratio device (VT300) and the fourth controllable multiple speed-ratio device (VT400) including at least one of a mechanical gear set, chain set, pulley set, and linkage rod set to provide a multiple-step transmission device for acceleration, deceleration, or changing direction, the multiple-step transmission device forming one of an automatic type, automated manual or manumatic type, mechanical clutch switching type, electric clutch switching type, air pressure switching type, or oil pressure switching type transmission device that is controlled by manual force or by the control unit (ECU100), and further comprising:

third and fourth output end transmission devices (T300, T400) each having one of a fixed speed ratio for acceleration, deceleration, or changing direction, a manually-operated, automatic, or semi-automatic speed-ratio-varying continuously variable transmission, and a hydraulic torque converter, said third and fourth output end transmission devices (T300,T400) including at least one of a mechanical gear set, chain set, pulley set, and linkage rod set, and said third and fourth output end transmission devices (T300,T400) being installed at one or more of the following locations:
(1) at input ends of the third and fourth controllable multiple speed-ratio devices (VT300,VT400);
(2) at output ends of the third and fourth controllable multiple speed-ratio devices (VT300,VT400);
(3) at input ends of third and fourth output end clutch devices on the left and right side (CL300,CL400); and
(4) at input ends of the third and fourth wheel sets (W300, W400) at a loading end,
at least one of said third and fourth output end clutch devices (CL300, CL400) is one of a manual or centrifugal clutch device, and a clutch controlled by an operation interface that engages or release an output end of the at least one of the third and fourth clutch devices (CL300, CL400) by at least one of an electric force, magnetic force, mechanical force, pressure, and hydraulic force, one or more of said at least one clutch devices (CL300, CL400) being installed at one of the following locations:
(1) at the input ends of the third and fourth controllable multiple speed-ratio devices (VT300,VT400);
(2) at the output ends of the third and fourth controllable multiple speed-ratio devices (VT300,VT400);
(3) at output ends of the third and fourth output end transmission devices (T300,T400);
(4) at the input ends of the third and fourth wheel sets (W300,W400) at the loading end, and
one or more of the clutch devices (CL300,CL400) is further arranged to perform the following functions in response to said driving by at least one of an electric force, magnetic force, mechanical force, pressure, and hydraulic force:
(1) performing transmission engaging and release;
(2) linearly controlling the continuous coupling torque between transmission engaging and releasing;
(3) performing transmission engaging and release, and having a torque limited coupling torque smaller than the engaging torque, after a respective one of the clutch devices is released;
(4) performing transmission engaging and release, and having a linear damping force smaller than the engaging torque that is increased when a rotation differential is increased, after the respective one of the clutch devices is released;
(5) performing transmission engaging and release, and having a linear damping force smaller than the engaging torque that is reduced when the rotation differential is increased, after the respective one of the clutch devices is released;
(6) performing any of functions (1) to (5) by a radial clutch device;
(7) performing any of functions (1) to (5) by an axial clutch device.

8. A driving system having epicycle gear sets with dual output ends equipped with individually-controlled multiple speed-ratio devices as claimed in claim 7, wherein the third controllable multiple speed-ratio devices (VT300) is installed between the left end output shaft (1011) of the epicyclic gear set (EG101) and the third wheel set (W300) and the fourth controllable multiple speed-ratio devices (VT400) is installed between the right end output shaft (1012) of the epicyclic gear set (EG101) and the third wheel sets (W400), thereby forming the drive system capable of being operated at different speeds and in a variable speed state, wherein:

the left end output shaft (1011) of the epicyclic gear set (EG101) drives the input end of the third controllable multiple speed-ratio device (VT300), and the right end output shaft (1012) of the epicyclic gear set (EG101) drives the input end of the fourth controllable multiple speed-ratio device (VT400);

the output end of the third controllable multiple speed-ratio device (VT300) drives the third wheel set (W300) and the output end of the fourth controllable multiple speed-ratio device (VT400) drives the fourth wheel set (W400);

the third controllable multiple speed-ratio device (VT300) and the fourth controllable multiple speed-ratio device (VT400) include at least one of mechanical gear sets, chain sets, pulley sets, or linkage rod sets to provide a multiple-step transmission device for acceleration, deceleration, and changing direction, the multiple-step transmission device being one of an automatic type, automated manual or manumatic type, mechanical clutch switching type, electric clutch switching type, pressure switching type, and oil pressure switching type of controllable multiple speed-ratio device controlled by manual force or by the control unit (ECU100);

the operation interface (MI100) directly controls at least one of the rotary kinetic power source (P100) and operation speed ratios of the third controllable multiple speed-ratio device (VT300), operation speed ratios of the fourth controllable multiple speed-ratio device (VT400), or controls at least one of the rotary kinetic power source (P100) and speed ratios of the third and fourth controllable multiple speed-ratio devices (VT300,VT400) through an control unit (ECU100);

an output end of the third output end transmission device (T300) drives the third wheel set (W300), and the input end thereof is driven by the rotary kinetic power from the output end of the third controllable multiple speed-ratio device (VT300); an output end of the fourth output end transmission device (T400) drives the fourth wheel set (W400), and the input end thereof is driven by the rotary kinetic power from the output end of the fourth controllable multiple speed-ratio device (VT400); said third output end transmission device (T300) and fourth output end transmission device (T400) being configured to be controlled by manual force or by the control unit (ECU100), configured to automatically change speed ratios in response to one of a driving rotational speed or a loading torque, or configured as one of the following transmission devices capable of automatically changing speed ratio through being externally controlled: a rubber belt type, metal belt type, chain type, eddy current, friction disk type, or non-coaxial type continuously variable transmission, a torque converter, and an electric continuously variable transmission (ECVT);

an output end of the third output end clutch device (CL300) is installed between the output end of the third controllable multiple speed-ratio device (VT300) and the third wheel set (W300) for controlling the third controllable multiple speed-ratio device (VT300) to output the rotary kinetic power to the third wheel set (W300), and an output end of the fourth output end clutch device (CL400) being installed between the output end of the fourth controllable multiple speed-ratio device (VT400) and the fourth wheel set (W400) for controlling the fourth controllable multiple speed-ratio device (VT400) to output the rotary kinetic power to the fourth wheel set (W400), and when the common load body (L100) is driven to operate by the rotary kinetic power source (P100), and the third wheel set (W300) and the fourth wheel set (W400) are operated in different speeds, the speed ratios of the third controllable multiple speed-ratio device (VT300) and the fourth controllable multiple speed-ratio device (VT400) are individually adjusted in response to load variation of the third wheel set (W300) and the fourth wheel set (W400) of the loading end, and the two output ends of the epicyclic gear set (EG101) perform differential operation adjustment to differentially drive the input ends of the third controllable multiple speed-ratio device (VT300) and the fourth controllable multiple speed-ratio device (VT400), or the operation interface (MI100) is used to control the control unit (ECU100) so as to control the individual speed ratio adjustments between the third controllable multiple speed-ratio device (VT300) and the fourth controllable multiple speed-ratio device (VT400).

9. A driving system having epicycle gear sets with dual output ends equipped with individually-controlled multiple speed-ratio device as claimed in claim 7, further comprising a direction changing signal sensor (S100) for sending a direction changing signal sensor to the control unit (ECU100) for controlling the relative speed ratio switching between the first controllable multiple speed-ratio device (VT100) and the second controllable multiple speed-ratio device (VT200), and between the third controllable multiple speed-ratio device (VT300) and the fourth controllable multiple speed-ratio device (VT400), thereby enhancing the performance of the driving system for changing direction, wherein the direction changing signal sensor (S100) includes one or more physical sensing device for sensing at least one of a direction changing degree of a steering mechanism, an inclined angle of vehicle body, vehicle idling, an upward/downward slope, and acceleration or deceleration, to be transmitted together with a signal from the operation interface (MI100) to be transmitted to the control unit (ECU100).

10. A driving system having epicycle gear sets with dual output ends equipped with individually-controlled multiple speed-ratio devices as claimed in claim 7, wherein the first, second, third, and fourth controllable multiple speed-ratio devices (VT100, VT200, VT300, VT400), the first, second, third, and fourth output end clutch devices (CL100, CL200, CL300, CL400), and the first, second, third, and fourth output end transmission devices (T100, T200, T300, T400) are respectively combined at two output sides of the epicyclic gear set (EG101).

11. A driving system having epicycle gear sets with dual output ends equipped with individually-controlled multiple speed-ratio devices as claimed in claim 1, further comprising a second stabilizer device (STD200) composed of one of a limited slip differential and a dual shaft connecting device having slip coupling torque and connected to the drive system at the following horizontally and coaxially opposite locations on two sides of front end of the common load body (L100), such that when a differential operation is performed between the two individual loads including wheel sets (W300,W400), the second stabilizer device (SDT200) stabilizes operation of the drive system, the slip coupling torque being provided by one of a viscous fluid effect, hydrodynamic damping effect, mechanical friction effect, electromagnetic vortex effect, and power generation reverse torque effect, and the stabilizer device (SDT200) being installed between parts of driving system at left and right sides of the common load body (L100) in one of the following configurations:

(1) between rotating parts of the third and fourth wheel sets (W300,W400) oppositely at the left side and the right side;
(2) between opposite output ends of the third and fourth controllable multiple speed-ratio devices (VT300, VT400) at the left side and the right side;
(3) between opposite output ends of said third and fourth output end clutch devices (CL300,CL400) at the left side and the right side;
(4) between input ends or output ends of said third and fourth output end transmission devices (T300,T400) oppositely at the left side and the right side;
(5) between a left side rotating part of the third wheel set (W300) and a right side rotating part of the fourth wheel set (W400).

12. A driving system having epicycle gear sets with dual output ends equipped with individually-controlled multiple speed-ratio device as claimed in claim 11, wherein the first, second, third, and fourth controllable multiple speed-ratio devices (VT100, VT200, VT300, VT400), the first, second, third, and fourth output end clutch devices (CL100, CL200, CL300, CL400), and the first, second, third, and fourth output end transmission devices (T100, T200, T300, T400) are respectively combined at two output sides of the epicyclic gear set (EG101).

13. A driving system having epicycle gear sets with dual output ends equipped with individually-controlled multiple speed-ratio device as claimed in claim 1, further comprising a direction changing signal sensor (S100) for sensing a direction changing signal sensor to the control unit (ECU100) for controlling the relative speed ratio switching between the first controllable multiple speed-ratio device (VT100) and the second controllable multiple speed-ratio device (VT200), thereby enhancing the performance of the driving system for changing direction, wherein the direction changing signal sensor (S100) includes one or more physical sensing device for sensing at least one of a direction changing degree of a steering mechanism, an inclined angle of vehicle body, vehicle idling, an upward/downward slope, and acceleration or deceleration, to be transmitted together with a signal from the operation interface (MI100) to be transmitted to the control unit (ECU100).

14. A driving system having epicycle gear sets with dual output ends equipped with individually-controlled multiple speed-ratio devices as claimed in claim 1, wherein the first and second controllable multiple speed-ratio devices (VT100,VT200), the first and second output end clutch devices (CL100,CL200), and the output end transmission devices (T100,T200) installed at two sides of the common load body (L100) are combined at two output sides of the epicyclic gear set (EG101).

15. A driving system having epicycle gear sets with dual output ends equipped with individually-controlled multiple speed-ratio devices as claimed in claim 1, further comprising a second epicyclic gear set (EG102) connected between the first epicyclic gear set (EG101) and the first transmission device (T101), said second epicyclic gear set (EG102) including a second left end output shaft (1021) and a second right end output shaft (1022), and further comprising a third controllable multiple speed-ratio device (VT300) installed between the second left end output shaft (1021) of the second epicyclic gear set (EG102) and a third wheel set (W300) at a front left side of the loading end of the common load body (L100), and fourth multiple speed-ratio device (VT400) installed between the second right end output shaft (1022) and a fourth wheel set (W400) at the front right side of the loading end of the common load body (L100), wherein an output end of the third controllable multiple speed-ratio device (VT300) drives the third wheel set (W300) at the left side of the loading end, and the input end of the third controllable multiple speed-ratio device (VT300) is driven by the rotary kinetic power from the second left end output shaft (1021) at the output end of the second epicyclic gear set (EG102); the output end of the fourth controllable multiple speed-ratio device (VT400) drives the fourth wheel set (W400) at the right side, and the input end of the fourth controllable multiple speed-ratio device (VT400) is driven by the rotary kinetic power from the second right end output shaft (1022) at the output end of the second epicyclic gear set (EG102); the third controllable multiple speed-ratio device (VT300) and the fourth controllable multiple speed-ratio device (VT400) including at least one of a mechanical gear set, chain set, pulley set, and linkage rod set to provide a multiple-step transmission device for acceleration, deceleration, or changing direction, the multiple-step transmission device forming one of an automatic type, automated manual or manumatic type, mechanical clutch switching type, electric clutch switching type, air pressure switching type, or oil pressure switching type transmission device that is controlled by manual force or by the control unit (ECU100), and further comprising:
 third and fourth output end transmission devices (T300, T400) each having one of a fixed speed ratio for acceleration, deceleration, or changing direction, a manually-operated, automatic, or semi-automatic speed-ratio-varying continuously variable transmission, and a hydraulic torque converter, said third and fourth output end transmission devices (T300,T400) including at least one of a mechanical gear set, chain set, pulley set, and linkage rod set, and said third and fourth output end transmission devices (T300,T400) being installed at one or more of the following locations:
 (1) at input ends of the third and fourth controllable multiple speed-ratio devices (VT300,VT400);
 (2) at output ends of the third and fourth controllable multiple speed-ratio devices (VT300,VT400);
 (3) at input ends of third and fourth output end clutch devices on the left and right side (CL300,CL400); and
 (4) at input ends of the third and fourth wheel sets (W300, W400) at a loading end,
 at least one of said third and fourth output end clutch devices (CL300, CL400) is one of a manual or centrifugal clutch device, and a clutch controlled by an operation interface that engages or release an output end of the at least one of the third and fourth clutch devices (CL300, CL400) by at least one of an electric force, magnetic force, mechanical force, pressure, and hydraulic force, one or more of said at least one clutch devices (CL300, CL400) being installed at one of the following locations:
 (1) at the input ends of the third and fourth controllable multiple speed-ratio devices (VT300,VT400);
 (2) at the output ends of the third and fourth controllable multiple speed-ratio devices (VT300,VT400);
 (3) at output ends of the third and fourth output end transmission devices (T300,T400);
 (4) at the input ends of the third and fourth wheel sets (W300,W400) at the loading end, and
 one or more of the clutch devices (CL300,CL400) is further arranged to perform the following functions in response to said driving by at least one of an electric force, magnetic force, mechanical force, pressure, and hydraulic force:

(1) performing transmission engaging and release;
(2) linearly controlling the continuous coupling torque between transmission engaging and releasing;
(3) performing transmission engaging and release, and having a torque limited coupling torque smaller than the engaging torque, after a respective one of the clutch devices is released;
(4) performing transmission engaging and release, and having a linear damping force smaller than the engaging torque that is increased when a rotation differential is increased, after the respective one of the clutch devices is released;
(5) performing transmission engaging and release, and having a linear damping force smaller than the engaging torque that is reduced when the rotation differential is increased, after the respective one of the clutch devices is released;
(6) performing any of functions (1) to (5) by a radial clutch device;
(7) performing any of functions (1) to (5) by an axial clutch device.

16. A driving system having epicycle gear sets with dual output ends equipped with individually-controlled multiple speed-ratio devices as claimed in claim 15, further comprising a second stabilizer device (STD200) composed of one of a limited slip differential and a dual shaft connecting device having slip coupling torque and connected to the drive system at the following horizontally and coaxially opposite locations on two sides of front end of the common load body (L100), such that when a differential operation is performed between the two individual loads including wheel sets (W300,W400), the second stabilizer device (SDT200) stabilizes operation of the drive system, the slip coupling torque being provided by one of a viscous fluid effect, hydrodynamic damping effect, mechanical friction effect, electromagnetic vortex effect, and power generation reverse torque effect, and the stabilizer device (SDT200) being installed between parts of driving system at left and right sides of the common load body (L100) in one of the following configurations:
 (1) between rotating parts of the third and fourth wheel sets (W300,W400) oppositely at the left side and the right side;
 (2) between opposite output ends of the third and fourth controllable multiple speed-ratio devices (VT300, VT400) at the left side and the right side;
 (3) between opposite output ends of the third and fourth output end clutch devices (CL300,CL400) at the left side and the right side;
 (4) between input ends or output ends of the third and fourth output end transmission devices (T300,T400) oppositely at the left side and the right side;
 (5) between a left side rotating part of the third wheel set (W300) and a right side rotating part of the fourth wheel set (W400).

17. A driving system having epicycle gear sets with dual output ends equipped with individually-controlled multiple speed-ratio devices as claimed in claim 15, wherein the third controllable multiple speed-ratio devices (VT300) is installed between the second left end output shaft (1021) of the second epicyclic gear set (EG102) and the third wheel set (W300) and the fourth controllable multiple speed-ratio devices (VT400) is installed between the second right end output shaft (1022) of the second epicyclic gear set (EG102) and the third wheel sets (W400), thereby forming the drive system capable of being operated at different speeds and in a variable speed state, wherein:

the second left end output shaft (1021) of the second epicyclic gear set (EG102) drives the input end of the third controllable multiple speed-ratio device (VT300), and the second right end output shaft (1022) of the epicyclic gear set (EG102) drives the input end of the fourth controllable multiple speed-ratio device (VT400);

the output end of the third controllable multiple speed-ratio device (VT300) drives the third wheel set (W300) and the output end of the fourth controllable multiple speed-ratio device (VT400) drives the fourth wheel set (W400);

the third controllable multiple speed-ratio device (VT300) and the fourth controllable multiple speed-ratio device (VT400) include at least one of mechanical gear sets, chain sets, pulley sets, or linkage rod sets to provide a multiple-step transmission device for acceleration, deceleration, and changing direction, the multiple-step transmission device being one of an automatic type, automated manual or manumatic type, mechanical clutch switching type, electric clutch switching type, pressure switching type, and oil pressure switching type of controllable multiple speed-ratio device controlled by manual force or by the control unit (ECU100);

the operation interface (MI100) directly controls at least one of the rotary kinetic power source (P100) and operation speed ratios of the third controllable multiple speed-ratio device (VT300), operation speed ratios of the fourth controllable multiple speed-ratio device (VT400), or controls at least one of the rotary kinetic power source (P100) and speed ratios of the third and fourth controllable multiple speed-ratio devices (VT300,VT400) through an control unit (ECU100);

an output end of the third output end transmission device (T300) drives the third wheel set (W300), and the input end thereof is driven by the rotary kinetic power from the output end of the third controllable multiple speed-ratio device (VT300); an output end of the fourth output end transmission device (T400) drives the fourth wheel set (W400), and the input end thereof is driven by the rotary kinetic power from the output end of the fourth controllable multiple speed-ratio device (VT400); said third output end transmission device (T300) and fourth output end transmission device (T400) being configured to be controlled by manual force or by the control unit (ECU100), configured to automatically change speed ratios in response to one of a driving rotational speed or a loading torque, or configured as one of the following transmission devices capable of automatically changing speed ratio through being externally controlled: a rubber belt type, metal belt type, chain type, eddy current, friction disk type, or non-coaxial type continuously variable transmission, a torque converter, and an electric continuously variable transmission (ECVT);

an output end of the third output end clutch device (CL300) is installed between the output end of the third controllable multiple speed-ratio device (VT300) and the third wheel set (W300) for controlling the third controllable multiple speed-ratio device (VT300) to output the rotary kinetic power to the third wheel set (W300), and an output end of the fourth output end clutch device (CL400) being installed between the output end of the fourth controllable multiple speed-ratio device (VT400) and the fourth wheel set (W400) for controlling the fourth controllable multiple speed-ratio device (VT400) to output the rotary kinetic power to the fourth wheel set (W400), and when the common load body (L100) is driven to operate by the rotary kinetic power source (P100), and the third wheel set (W300) and the fourth wheel set (W400) are operated in different speeds, the speed ratios of the third controllable multiple speed-ratio device (VT300) and the fourth controllable multiple speed-ratio device (VT400) are individually adjusted in response to load variation of the third wheel set (W300) and the fourth wheel set (W400) of the loading end, and the two output ends of the epicyclic gear set (EG101) perform differential operation adjustment to differentially drive the input ends of the third controllable multiple speed-ratio device (VT300) and the fourth controllable multiple speed-ratio device (VT400), or the operation interface (MI100) is used to control the control unit (ECU100) so as to control the individual speed ratio adjustments between the third controllable multiple speed-ratio device (VT300) and the fourth controllable multiple speed-ratio device (VT400).

18. A driving system having epicycle gear sets with dual output ends equipped with individually-controlled multiple speed-ratio devices as claimed in claim 1, wherein the common load body (L100) is further installed with non-powered wheels not being driven by the rotary kinetic power source (P100).

* * * * *